US011729122B2

(12) United States Patent
Bar-on et al.

(10) Patent No.: US 11,729,122 B2
(45) Date of Patent: Aug. 15, 2023

(54) CONTENT SUGGESTION SYSTEM FOR REAL-TIME COMMUNICATION ENVIRONMENTS

(71) Applicants: Atlassian Pty Ltd., Sydney (AU); Atlassian Inc., San Francisco, CA (US)

(72) Inventors: Noam Bar-on, San Francisco, CA (US); Bharath Booshan Lakshmi Narayanan, Sunnyvale, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 85 days.

(21) Appl. No.: 17/133,432

(22) Filed: Dec. 23, 2020

(65) Prior Publication Data
US 2022/0200937 A1 Jun. 23, 2022

(51) Int. Cl.
G06F 15/16 (2006.01)
H04L 51/04 (2022.01)
G06Q 10/10 (2023.01)
H04L 51/02 (2022.01)

(52) U.S. Cl.
CPC ............ H04L 51/04 (2013.01); G06Q 10/10 (2013.01); H04L 51/02 (2013.01)

(58) Field of Classification Search
CPC .......... H04L 51/04; H04L 51/02; G06Q 10/10
USPC ......................................................... 709/204
See application file for complete search history.

(56) References Cited

U.S. PATENT DOCUMENTS

| 2013/0307997 | A1* | 11/2013 | O'Keefe | G06F 16/4393 348/207.1 |
| 2018/0189408 | A1* | 7/2018 | O'Driscoll | H04L 51/52 |
| 2019/0108114 | A1* | 4/2019 | De Vansa Vikramaratne | G06F 21/6209 |
| 2019/0179494 | A1* | 6/2019 | Colagrosso | G06N 20/00 |
| 2021/0142000 | A1* | 5/2021 | Vis | G06F 40/169 |
| 2021/0165829 | A1* | 6/2021 | Dornbush | G06Q 10/101 |
| 2022/0222304 | A1* | 7/2022 | Chung | H04L 51/046 |

* cited by examiner

Primary Examiner — Imad Hussain
(74) Attorney, Agent, or Firm — Brownstein Hyatt Farber Schreck, LLP

(57) ABSTRACT

A content suggestion system for suggesting one or more content items to a client application on a client device may include a content suggestion service and a collaborative content management and communication system communicably coupled to the content suggestion service and comprising a store of content items. The content suggestion service may be configured to, during a real-time chat session between a first user and a second user, receive one or more communication events exchanged between the first user and the second user, determine, using the received one or more communication events, a subject of the real-time chat session, and cause an identifier of a candidate suggested content item to be displayed to the first user.

20 Claims, 10 Drawing Sheets

US 11,729,122 B2

CONTENT SUGGESTION SYSTEM FOR REAL-TIME COMMUNICATION ENVIRONMENTS

TECHNICAL FIELD

The present disclosure is generally directed to collaborative document management and communication systems and, more specifically, to systems and methods for suggesting content items to users based on communication events.

BACKGROUND

Modern electronic devices facilitate myriad uses, both for business and personal endeavors. For example, electronic devices such as personal computers, tablets, mobile phones, and the like, are used in both business and personal contexts for creating and storing documents, writing computer code, communicating with other individuals (e.g., via email, chat services, voice and video calls, etc.), and the like. Collaborative computer-based systems, such as shared file-storage systems, may be used by organizations to store files and other content items that can be accessed by individuals in the organization. Due to the vast numbers and types of content items that may be stored in such systems, it may be difficult for users to find relevant content items when they are needed, or even to know what content items may be available in a given system.

SUMMARY

A content suggestion system for suggesting one or more content items to a client application on a client device may include a content suggestion service and a collaborative content management and communication system communicably coupled to the content suggestion service and comprising a store of content items associated with an organization, wherein a respective content item in the store of content items is associated with a respective access vector generated at least in part by analyzing content interactions with the respective content item by one or more users in the organization. The content suggestion service may be configured to, during a real-time chat session between a first user and a second user, receive one or more communication events exchanged between the first user and the second user, determine, using the received one or more communication events, a subject of the real-time chat session, obtain an identity vector of the first user, identify, in the store of content items, a candidate content item associated with an access vector that satisfies a similarity threshold with the identity vector of the first user, and cause an identifier of the candidate content item to be displayed to the first user in a graphical user interface associated with the real-time chat session.

The identity vector may be a first identity vector, the candidate content item may be a first candidate content item, the access vector may be a first access vector, and the content suggestion service may be further configured to, during the real-time chat session, obtain a second identity vector of the second user, identify, in the store of content items, a second candidate content item associated with a second access vector that satisfies a similarity threshold with the second identity vector of the second user, the second candidate content item different than the first candidate content item, and cause an identifier of the second candidate content item to be displayed to the second user.

The identity vector of the first user may be based at least in part on a content interaction history of the first user. The identity vector of the first user may be based at least in part on a position of the first user in the organization. Determining the subject of the real-time chat session may include at least one of analyzing the received one or more communication events to determine a semantic content of the received one or more communication events, or obtaining a user-defined topic of the real-time chat session.

The respective access vector of the respective content item may be based at least in part on an interaction with the respective content item by a third user different from the first user and the second user and a position of the third user in the organization.

A content suggestion system for suggesting one or more content items to a client application on a client device may include a content suggestion service and a collaborative content management and communication system communicably coupled to the content suggestion service and including content items associated with an organization and a multi-dimensional association graph defining associations between the content items and users in the organization, a respective association between a respective content item and a respective user generated at least in part by analyzing a content interaction history between the respective content item and the respective user. The content suggestion service may be configured to, during a real-time chat session between a first user and a second use receive one or more communication events exchanged between the first user and the second user, determine, using the received one or more communications, a subject of the real-time chat session, obtain an identity vector of the first user, analyze the multi-dimensional association graph to identify, based at least in part on the associations between the content items and the users in the organization, a set of candidate content items related to the subject of the real-time chat session and to the identity vector of the first user, and cause an identifier of at least one content item of the set of candidate content items to be displayed to the first user in a graphical user interface associated with the real-time chat session.

The content interaction history between the respective content item and the respective user may include at least one of an access of the respective content item by the respective user, an edit of the respective content item by the respective user, a comment on the respective content item by the respective user, or an authoring of the respective content item by the respective user.

The set of content items may be a first set of content items, and obtaining the identity vector of the first user may include analyzing the multi-dimensional association graph to identify a second set of content items with which the first user has interacted and one or more attributes of each of the second set of content items. Obtaining the identity vector may further include generating the identity vector based at least in part on the one or more attributes of each of the second set of content items. The one or more attributes include one or more of a content type, a technical rating, a file storage location, and an associated department within the organization.

The identity vector may be a first identity vector, the set of candidate content items may be a first set of candidate content items the graphical user interface may be a first graphical user interface displayed on a first client device to the first user, and the content suggestion service may be further configured to, during the real-time chat session, obtain a second identity vector of the second user, analyze the multi-dimensional association graph to identify, based at least in part on the associations between the content items and the users in the organization, a second set of candidate content items related to the subject of the real-time chat session and to the identity vector of the second user, and cause an identifier of at least one content item of the second of candidate content items to be displayed to the second user in a second graphical user interface associated with the real-time chat session, the second graphical user interface displayed to the second user on a second client device different from the first client device.

A content suggestion system for suggesting one or more content items to a client application on a client device may include a content suggestion service and a collaborative content management and communication system communicably coupled to the content suggestion service and comprising content items associated with an organization. The content suggestion service may be configured to generate a multi-dimensional association graph defining associations between the content items and users in the organization by analyzing content interaction histories of a plurality of users in the organization, and during a real-time chat session between a first user and a second user, receive one or more communication events exchanged between the first user and the second user, determine, using the received one or more communications, a subject of the real-time chat session, obtain an identity vector of the first user, analyze the multi-dimensional association graph to identify a set of candidate content items related to the subject of the real-time chat session and to the identity vector of the first user, and cause an identifier of at least one content item of the set of candidate content items to be displayed to the first user in a graphical user interface associated with the real-time chat session.

The content suggestion service may be further configured to, after generating the multi-dimensional association graph, generate an updated multi-dimensional association graph by analyzing new content interaction histories of the plurality of users in the organization. The identity vector of the first user may be based at least in part on a content interaction history of the first user. The identity vector of the first user may be based at least in part on a position of the first user in the organization.

A content suggestion system for suggesting one or more content items to a client application on a client device may include a content suggestion service and a collaborative content management and communication system communicably coupled to the content suggestion service and comprising content items associated with an organization. The content suggestion service may be configured to, during a real-time communication session between a first user and a second user, receive one or more communication events exchanged between the first user and the second user during the real-time communication session, determine a first query based at least in part on the one or more communication events and an identifier of the first user, and determine a second query based at least in part on the one or more communication events and an identifier of the second user. The content suggestion service may be further configured to query the collaborative content management and communication system using the first query and the second query, receive, from the collaborative content management and communication system and in response to the first query, a first set of candidate content items related to the first query receive, from the collaborative content management and communication system and in response to the second query, a second set of candidate content items related to the second query, the second set of candidate content items different from the first set of candidate content items, cause a first identifier of a first content item from the first set of candidate content items to be displayed to the first user, and cause a second identifier of a second content item from the second set of candidate content items to be displayed to the second user.

The operation of determining the first query may include performing a natural language processing operation on the one or more communication events to determine a subject of the one or more communication events.

The content suggestion service may be further configured to, after causing the first identifier of the first content item to be displayed to the first user, receive one or more subsequent communication events exchanged between the first user and the second user during the real-time communication session, determine a third query based at least in part on the one or more subsequent communication events and the identifier of the first user, query the collaborative content management and communication system using the third query, receive, from the collaborative content management and communication system and in response to the third query, a third set of candidate content items related to the third query, the third set of candidate content items different from the first set of candidate content items, and cause a third identifier of a third content item from the third set of candidate content items to be displayed to the first user. The first identifier of the first content item may be displayed to the first user while the one or more communication events are displayed to the first user, and the third identifier of the third content item may be displayed to the first user while the one or more additional communication events are displayed to the first user.

Figure 1:
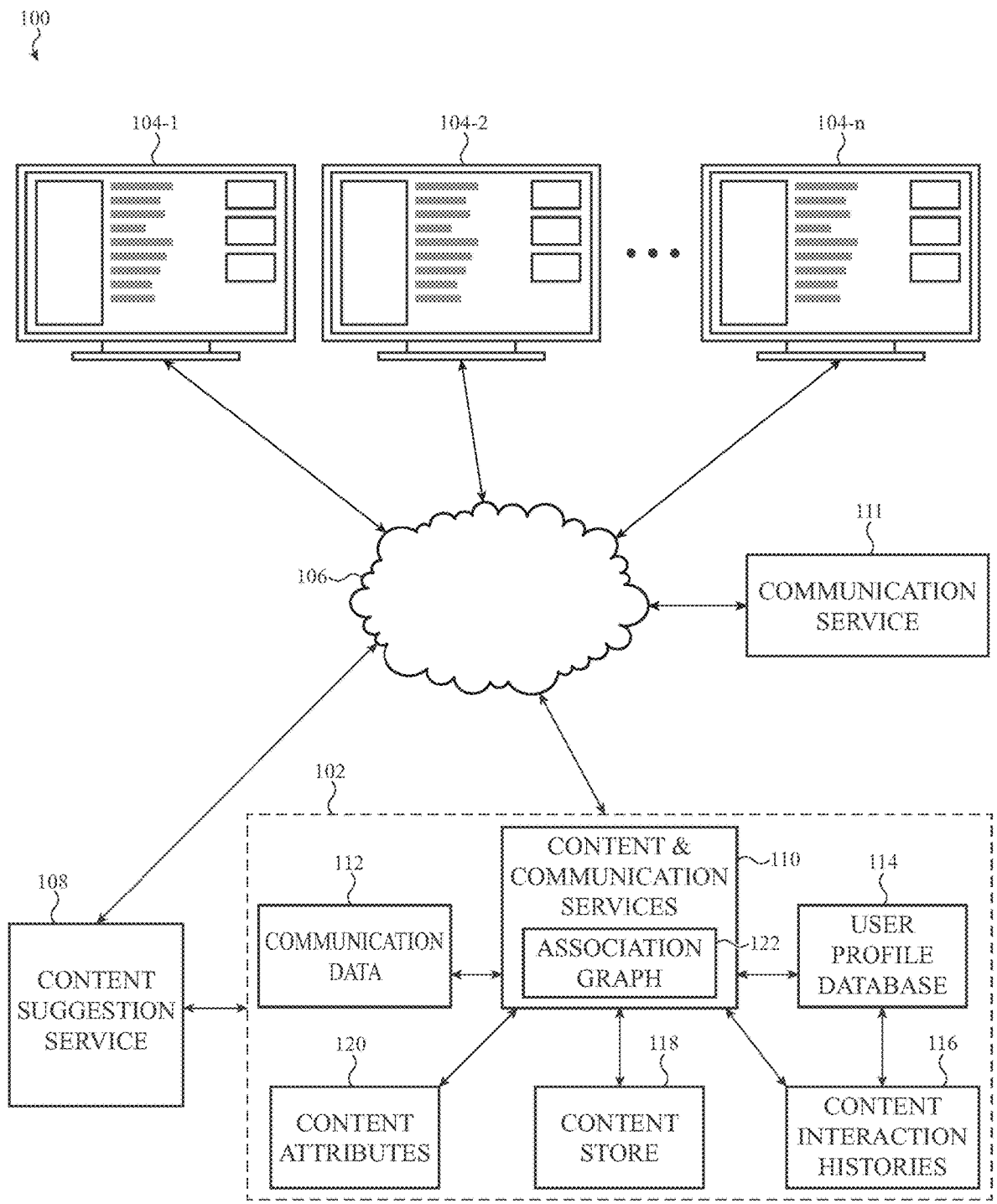
FIG. 1 depicts an example system in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is generally directed to systems and methods for providing intelligent content suggestions to users of a collaborative content management and communication system. The suggestions may be tailored to specific communication instances within the system. For example, when users are engaged in a chat session, the users may be provided with content suggestions based on a subject matter of the chat session. As another example, a user who is viewing or editing a document may receive a suggestion of another individual who may be associated with that document or the subject matter of that document. To further increase the relevance of the suggestions to a user of the system, the suggestions may be tailored to the particular user who is engaging the system. For example, a marketing manager may be suggested content that is relevant to that user's role within the organization (e.g., marketing materials), while a software engineer may be suggested different content (e.g., code commits, technical specifications). Thus, each individual may be provided with suggestions of content, other users, or other information, that is both relevant to a subject of their current communication events (e.g., a subject of a chat session) as well as to their own personal role, skills, interests, or the like.

One example instance in which content suggestions may be provided is a real-time chat session between two or more users of the system. In such cases, as described herein, the system may determine a subject of the chat session, in real-time, while the chat session is ongoing. The system may then retrieve content items that are relevant to the subject of the chat session and provide those content items to the users in the chat session. Thus, if two users are chatting about an upcoming product release, the system determines (e.g., using semantic analysis, natural language processing operations, and/or other suitable techniques) that the subject of the chat session pertains to the product release. The system may then identify content items related to the product release and suggest those content items to the users in the chat.

However, in modern workplaces, searching for content based on a subject may result in multitudes of matches, not all of which will be relevant to the users in the chat session. For example, simply searching for documents related to a product release may return results ranging from software code to marketing materials to manufacturing contracts. If a software engineer is in the chat, however, the marketing materials and manufacturing contracts may not be particularly relevant or useful to that individual. Similarly, if a marketing manager is in the chat, software code may not be particularly relevant or useful to that individual. Accordingly, the system may individually tailor the suggested content items to the users in the chat session based on various factors such as the identity of the user, the user's position or rank in an organization, or the like, as well as factors such as what types of user typically accesses a particular type of document, and what types of documents the user typically accesses. Thus, continuing the example from above, the system may suggest to the marketing manager content items that are relevant to the subject of the chat session but are also specifically relevant to the marketing manager's role in the organization, while suggesting, to the software engineer, a different set of content items (e.g., content items that are relevant to the subject of the chat session and that are relevant to the software engineer's position or technical role in the organization).

In order to provide targeted content suggestions, the system may generate and employ a multi-dimensional association graph that relates content items within the system to other information, including but not limited to particular users or individuals, roles within the organization, user attributes, subjects, file interaction histories, and the like. A query engine may interact with the multi-dimensional association graph to determine unique and tailored content suggestions to individual users of the system.

The multi-dimensional association graph may provide numerous advantages to the content suggestion functions of the system. For example, the multi-dimensional association graph may be generated based on actual content interactions between many different users and many different content items, which can allow the multi-dimensional association graph to find associations between content and users that would not be present in or even necessarily derivable from conventional databases. The multi-dimensional association graph can therefore produce more relevant content suggestions to individuals. By way of illustration, conventional databases may allow both documents and users to be associated with a particular department (e.g., engineering). However, there may be individuals in the engineering department who routinely engage with content items outside of the engineering department, such as marketing materials, legal contracts, or the like. Content suggestions that simply retrieve documents from within the same department as a particular user, as might be performed using a conventional database, would improperly ignore many content items that would be of interest to the user.

By contrast, the multi-dimensional association graph described herein can associate content and users based on actual historical content access records and patterns, and can ultimately find and represent connections between users and content that would not be modeled or represented in a conventional database. For example, a multi-dimensional association graph may be used to determine, based on historical content access records, what content items or types of content items are commonly accessed or interacted with by a particular user and/or a particular type of user, regardless of whether or not the content items are in a same or similar category as the user. In this way, the multi-dimensional graph may holistically associate content items of various types, categories, or other classifications with particular users, user types, positions, roles, and the like.

The multi-dimensional association graph may also allow highly personalized content suggestions that are based on a given user's own content preferences and historical usage. Thus, for example, if a salesperson routinely accesses engineering specifications in addition to marketing materials, the multi-dimensional association graph may include associations between that user and engineering specifications, in addition to associations between that user and marketing materials. Accordingly, the content suggestions returned by the query engine for that particular user may include engineering specifications, whereas a similar query for a different salesperson may only return marketing materials. In this way, the multi-dimensional association graph may represent and/or store a unique network of content items, content categories, interaction histories, and the like, for each individual user of the system.

The multi-dimensional association graph may also be continuously or periodically updated in order to best reflect how users are currently interacting with the content items in the system. Thus, for example, if a given user or type of user begins interacting with new types of content items, the multi-dimensional association graph may reflect or include the new associations between users and content items, such that content suggestions from the query engine will be relevant to the ways in which the users are currently or recently interacting with content items.

In addition to suggesting content items to users in a chat session, the multi-dimensional association graph may also be used to identify and suggest to a user other individuals who may be relevant to content that the user is viewing. For example, if a user is viewing a technical specification document, it may useful to the user to know who else has interacted with that document. Because the multi-dimensional association graph represents or models interaction histories between users and content items, the instant system can provide more useful suggestions than simply showing the original author or editor of the document being viewed. For example, the multi-dimensional association graph may contain associations that allow the system to identify users who have interacted with documents related to the same subject matter, or who have interacted with documents of the same type (e.g., technical specifications), and can recommend or identify those users despite them not having directly authored or edited the document being viewed. In practical use, this manner of identifying and suggesting individuals can allow a user to quickly and easily identify people to contact regarding the particular document or subject that they are viewing.

FIG. 1 depicts an example content suggestion system 100 (or simply "system 100") in which the techniques described herein may be employed. The system 100 includes a collaborative content management and communication system 102 (also referred to herein as a content and communication system 102), a content suggestion service 108, a communication service 111, and client devices 104 (104-1, . . . , 104-$n$) that communicate via a network 106 (e.g., the Internet). The client devices 104 may be any suitable type of device, including but not limited to a desktop or laptop computer, tablet computer, mobile phone, personal digital assistant, smart device, voice-based digital assistant, or the like.

The collaborative content management and communication system 102 may be or may include one or more servers, content stores (e.g., databases), communications systems, data structures, programs, or other components, systems, or subsystems that provide content storage, access, user-to-user communications, and/or other services described herein. For example, the collaborative content management and communication system 102 may include and/or provide communication data 112, a user profile database 114, content interaction histories 116, content attributes 120, and a content store 118, as well as content and communication services 110. These components may execute over one or more computing resources of the collaborative content management and communication system 102, and may share resources such as storage media, processors, memory, and the like. In some cases, they may be instantiated as separate computer systems (e.g., servers, databases, etc.) that communicate with one another to provide the functionality of the collaborative content management and communication system 102.

The content store 118 may store content items related to an organization that is using or otherwise associated with the content and communication system 102. The content store 118 may include content of numerous types, including but not limited to text documents, spreadsheets, computer code (e.g., source code files, compiled code and/or applications, libraries, etc.), emails, media content (e.g., images, videos, etc.), data files, content pages (e.g., web pages, personalized landing pages), blogs, comment forums (including comments and/or other comment data), data objects, and the like. In some cases, the collaborative content management and communication system 102 may generate and/or display to users content pages that include or display various types of data and facilitate various types of interactions. Content pages may be associated with topics, departments in an organization, teams, projects, or the like, and may include data objects, files, comments and commenting functions, chat and/or other communication functions, emails, or the like. Users may interact with content pages and/or the content that is displayed or otherwise accessible via the content pages. The content and communication services 110 may retrieve content items (and/or data) from the content store 118 and provide it to client devices (e.g., the client devices 104).

Content attributes 120 may include metadata or other information associated with the content items stored therein, including, for example, content types, content authors, content editors, content owners, and the like. In some cases, as described herein, the content attributes 120 may include an access vector for each or a subset of the content items in the content store 118. The access vector for a content item may represent or model the type or types of users who have historically interacted with the content item. The access vector may be determined at least in part by analyzing a multi-dimensional association graph that defines and/or models associations between content items and users in the organization. As described herein, the access vectors may be used to determine the relevance of a given content item to a given user. Notably, the access vectors for content items (as well as the multi-dimensional association graph more generally) are generated using actual content access histories of users with the content items in the content and communication system 102, and, as such, can more accurately reflect the likelihood that a given content item will be useful or relevant to a given user. While the content attributes 120 are shown in FIG. 1 as separate from the content store 118, they may be part of the content store 118 and stored in association with the content items to which they relate.

The content interaction histories 116 include historical records of content interactions between users and content items in the content and communication system 102. For example, the content interaction histories 116 may include records of which users interacted with which content items, as well as properties of those interactions. Content interactions that are stored by the content interaction histories 116 may include, without limitation, creating content items; editing content items; commenting on content items; viewing content items; "liking" or endorsing content items; sharing content items (e.g., emailing); linking to or referring to content items in other content items, chats, emails, communications, etc.; and durations interactions with content items. As described herein, content interaction histories 116 may be used to generate a multi-dimensional association graph that associates users to content items, as well as to generate identity vectors and/or access vectors for use in determining or estimating the relevancy of a particular content item to a particular user (and/or identifying content items, from the content store 118, that may be relevant to a particular user).

The user profile database 114 may store and maintain user profiles about users of the content and communication system 102. User profiles may include numerous types of information (also referred to as attributes) about the users of the system, including but not limited to names, departments, job titles, roles, teams with which they are associated, projects with which they are associated, supervisors, subordinates, team members, technical or occupational expertise, relative position in a hierarchy in an organization or entity, and identity vectors. Identity vectors, like access vectors of content items, may represent or model the type or types of content with which a user interacts, as well as factors based on the user's user profile, such as job title, technical expertise, and the like. Identity vectors may be determined at least in part by analyzing a multi-dimensional association graph that defines and/or models associations between content items and users in the organization. In some cases, identity vectors may be compared against content vectors to determine whether a given content item is likely to be relevant to or useful to a user. For example, if an access vector of a content item satisfies a similarity threshold with an identity vector of a user, that content item may be considered potentially relevant to the user and may be provided to the user as a suggestion, as described herein. The identity vectors and access vectors may be multi-dimensional data structures, such they can represent multiple content attributes and user attributes. For example, an identity vector may represent attributes of documents with which the user has interacted with, the user's job title, a user's department, a user's team associations, a user's level of education and/or degree, a geographical location or office location of the user, a technical rating of the user (e.g., whether the user is considered a technical or non-technical user, or a score or rating on a scale), or the like. Similarly, an access vector of a content item may represent attributes of users who have interacted with that document (e.g., their job title, department, education or degree, geographical location, etc.), attributes of the content item itself (e.g., its subject, its title, its storage location, its file type, etc.), or the like.

The access and identity vectors may facilitate highly accurate and dynamic matching of users to content items, thereby allowing for highly relevant content items to be suggested to users. For example, some users may interact with documents that are not conventionally associated with their role or title. For example, an engineer may be placed on a marketing project or team, and therefore may have a history of accessing marketing documents. Conventional techniques may simply suggest engineering or other technical documents to the engineer based on his or her department and/or job title. By generating access vectors and identity vectors that are based on actual content interaction histories between users and content items (and optionally generated using a multi-dimensional association graph), content suggestions may be made based on data that is not available in conventional database systems.

The content and communication services 110 may provide services of the content and communication system 102 to the client devices 104. For example, the content and communication services 110 may receive requests from the client devices and perform services and/or serve content in response to the requests. The content and communication services 110 provides communication functions to the client devices 104, including but not limited to chat, email, videoconferencing, telephony (e.g., audio communications), and the like. The content and communication services 110 may store and retrieve communication data 112 in conjunction with providing the communication functions.

The content and communication services 110 may also interact with the content store 118, the content attributes 120, the content interaction histories 116, and the user profile database 114 to generate one or more multi-dimensional association graphs 122. A multi-dimensional association graph defines and/or represents associations between content items and users in the organization, and may be generated at least in part by analyzing content interaction histories (e.g., from the content interaction histories 116) between users and content items (e.g., in the content store 118). The multi-dimensional association graph 122 may include numerous types of associations between content items and users (and/or types of users or attributes of users). As one illustrative example, the multi-dimensional association graph 122 may define an "authored" association between a content item and a first user, an "accessed" association between the content item and a second user, and a "commented on" association between the content item and a third user. Further, based on information in the user profile database 114, the associations in the graph 122 may also encode or otherwise represent how different attributes or properties of different users relate to attributes or properties of content items. For example, associations in the graph 122 may an include associations between a content item and an attribute of the user that "authored" the content (such as "engineer"), and an attribute of the user that "accessed" the content (such as "marketing department"), and an attribute of the user that "commented on" the content (such as "chief technical officer").

These, and other, types of associations in the multi-dimensional association graph 122 allow the graph 122 to be queried or otherwise analyzed to return content items that are likely to be relevant to a given user. For example, the graph 122 may be used to search for content that is relevant to a particular subject or topic (e.g., the subject of a chat session, as described herein), as well as specifically relevant to that particular user. For example, if an engineer who is heavily involved in marketing efforts is involved in a chat relating to a product, a graph analysis or query may return marketing-focused content that is related to the product and is similar to documents that the engineer (or others having similar user profiles and/or content access histories) has been interacting with.

As noted above, the content and communication services 110 may facilitate real-time chat sessions between two or more users of the system 100, in which users can exchange text, images, and/or other content in real-time. For example, the content and communication services 110 may receive communication events from users involved in a real-time chat session and forward the received communication events to other intended users involved in the real-time chat session. Communication events may be or include text, images, and/or other content sent by a user involved in the chat to the one or more other users. Communication events may be stored in the communication data 112. Chat sessions may also be associated with user-defined topics, which may be displayed to the users to help them identify and organize different chat sessions that they may be involved in, and which may be used to identify content items that may be relevant to the real-time chat session.

The content and communication services 110 may analyze the communication events of real-time chat sessions to determine one or more subjects of the real-time chat session. More particularly, as described herein, the system 100 may be configured to generate suggestions of content items that are relevant to a subject of a chat session. To facilitate the identification of such content items, the content and communication services 110 may analyze the communication events to determine a subject of the real-time chat session, and then, in conjunction with the content suggestion service 108 and the association graph 122, identify content items that are relevant to the subjects.

In order to determine the subject of a communication session between users, the content and communication services 110 employ analysis techniques that are suitable for that particular type of communication. For example, in the context of a text-based chat session, the content and communication services 110 may use natural language processing operations (and/or other semantic analysis techniques) to determine the subject of a real-time chat session. Example natural language processing techniques may include statistical natural language processing, neural natural language processing, tokenization, lemmatization, sentiment analysis, or the like.

Chat sessions may relate to more than one subject, such as when multiple subjects are being discussed in close temporal proximity, or when the topic of a chat session changes or evolves over time. In such cases, the content and communication services 110 may determine multiple subjects for a chat session. The multiple subjects may be used to identify different sets of content items to suggest to the users in the chat session. In some cases, the content and communication services 110 may identify subjects based on the communication events that are visible to a user at a given time. Thus, as a chat session evolves and different textual content is displayed, the content and communication services 110 may identify different subjects and provide appropriate content suggestions based on the visible content.

The content suggestion service 108 may be or may include one or more servers, content stores (e.g., databases), communications systems, data structures, programs, or other components, systems, or subsystems that provide content and personnel suggestions, and/or other services described herein. The content suggestion service 108 may execute over one or more computing resources of the system 100, and may share resources such as storage media, processors, memory, and the like. In some cases, the content suggestion service 108 is a separate system from the content and communication system 102 (e.g., a separate server), while in other cases it shares computing resources with the content and communication system 102 (e.g., it may be a module or program executed by the content and communication system 102 and/or the computing resources of the system 102).

The content suggestion service 108 interacts with the client devices 104 and the collaborative content management and communication system 102 to provide content suggestions to the users of the client devices 104. For example, the content suggestion service 108 may receive communication events exchanged between users in a real-time chat session, determine, using the received communication events, a subject of the real-time chat session, identify content items that are relevant to the real-time chat session and to the specific users in the chat session, and cause identifiers (e.g., links, icons, shortcuts, previews, etc.) of the content items to the users in the real-time chat session. The content suggestion service 108 may interact with the content and communication system 102 to perform these and other functions. While the content suggestion service 108 is shown in FIG. 1 as separate from the content and communication system 102, this is merely for illustration, and the content suggestion service 108 may be considered part of the content and communication system 102. Indeed, the content suggestion service 108 may be programmatically integrated with one or multiple of the components of the content and communication system 102. For example, aspects or functions that are attributed to the content suggestion service 108 may be integrated with and/or performed by the content and communication services 110, the association graph 122, the user profile database 114, the communication data 112, the content attributes 120, the content store 118, and the content interaction histories 116. Thus, the content suggestion service 108 may in some cases be implemented by or as multiple different sub-functions of the collaborative content management and communication system 102.

The content suggestion service 108 may also identify other individuals that can be suggested to a user who is interacting with content, based on the particular content being accessed. For example, as described herein, while a user is interacting with a content item (and/or based on a user interaction with multiple content items), the content suggestion service 108 may identify other individuals who may be relevant to that content item, and provide an identifier of those individuals to the user. The user may then contact those individuals (or access content associated with those individuals).

The content suggestion service 108 may send and receive information exclusively to and from the client devices 104, exclusively to and from the content and communication system 102, or from both (and/or from other modules, components, devices, services, clients, servers, etc., not shown in FIG. 1).

The communication service 111 may provide communication services to the client devices 104 and/or the content and communication system 102. For example, the communication service 111 may provide or facilitate communication services such as chat, email, videoconferencing, telephony (e.g., audio communications), or the like, between client devices 104 and/or other devices in the system 100. In some cases, communication events are received by the communication service 111, and are made available to the content suggestion service 108 and/or the content and communication system 102 as appropriate to provide the functionality described herein. For example, communication events received by the communication service 111 may be made available to the content suggestion service 108 to facilitate a determination of a subject of a chat session (or other type of communication interaction). As another example, communication events received by the communication service 111 may be made available to the content and communication system 102 (e.g., the content and communication services, the communication data 112, etc.) to facilitate storage and/or analysis of the communication events.

It is appreciated that the foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, each device or system of the system 100 of FIG. 1 can be implemented in a number of suitable ways. The client devices 104, the content and communication system 102, the content suggestion service 108, and/or the communication service 111 may each include one or more purpose-configured components, which may be either software or hardware. In particular, it may be appreciated that although these functional elements are identified as separate and distinct devices (e.g., servers) that can each include allocations of physical or virtual resources, such as one or more processors, memory, and/or communication modules (e.g., network connections and the like), such an implementation is not required. More generally, it may be appreciated that the various functions described herein can be performed by any suitable physical hardware, virtual machine, containerized machine, or any combination thereof. An example implementation of hardware for implementing the system 100 is described below with respect to FIG. 7.

Figure 2A:
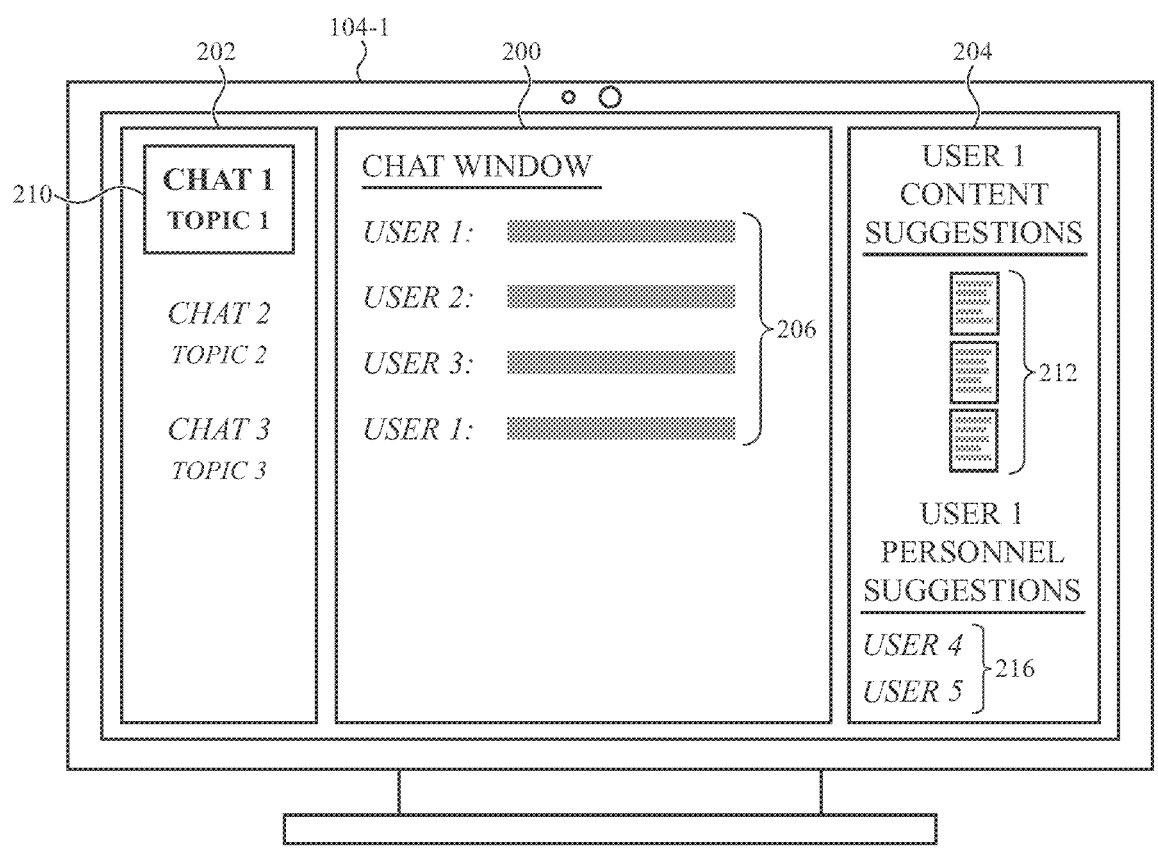
FIG. 2A depicts an example client device and user interface that may be used to provide content and personnel suggestions to a first user of a collaborative content management and communication system, as described herein.

FIG. 2A depicts the client device 104-1 displaying an example graphical user interface associated with a real-time chat function of the content and communication system 102. The client device 104-1 may execute or otherwise provide access to a client application that is part of or otherwise interacts with the content and communication system 102 to provide the functionality described herein. The functionality shown and described herein with reference to the client devices 104 may be provided by applications, computer programs, and/or services that are distributed among any combinations of the components shown in the system 100. Thus, for example, the client devices 104 may execute a local application that provides aspects of the content and communication functionality described herein, and also communicates with components such as the content suggestion service 108, the content and communication system 102, and/or the communication service 111. In some cases, the client devices 104 are configured to render (e.g., in a web browser) graphical user interfaces (e.g., on webpages) provided or served by other components of the system 100 (e.g., the content suggestion service 108, the content and communication system 102, and/or the communication service 111). It will be understood that the graphical and/or programmatic elements shown and described herein may reside on or be executed by various different computing resources, alone and/or in combination with each other.

The client device 104-1 may include a display for displaying the graphical user interface. The client device 104-1 may also include a camera for capturing images (e.g., video and/or still images) of a user of the client device 104-1, a text-input device (e.g., a keyboard, voice-to-text software, etc.) for receiving text inputs from a user of the client device 104-1, and a microphone (or other audio capture device) for capturing audio of the user of the client device 104-1. The client device 104-1 may also include communications systems for sending and receiving videoconference streams. Details of the client device 104-1 may apply equally to other client devices 104 described herein (e.g., the client device 104-2).

The graphical user interface displayed to a user may include a chat content region 200, a chat session selection region 202, and a content suggestion region 204. The chat content region 200 may display communication events exchanged between users participating in the chat-session. As shown, three users are participating in the chat session (user 1, user 2, and user 3), though this is merely an illustrative example, and the chat session may have more or fewer users.

It will be appreciated that the figures illustrate multiple different client devices, and thus different instances of the graphical user interfaces that provide the functionality described herein. For simplicity, graphical user interface elements that are common to the client devices (e.g., a chat content region 200, a chat session selection region 202, and a content suggestion region 204) will be referred to with the same element numbers, even though those instances may be on different client devices.

The chat session may allow communication events (e.g., text-based messages) to be exchanged between users in real-time. For example, a communication event that is sent by a first user to one or more second users may appear on the one or more second users' displays shortly after being sent (e.g., within seconds, depending on available network connectivity and speed), and the one or more second users may be able to immediately view and respond. The communication events may include various types of content, including text content, images, videos, audio recordings (e.g., voice recordings), audio and/or video streams (e.g., audio- and/or video-conference content), or the like. FIG. 2A illustrates text content, though this is merely one example of the communication events that may be exchanged between users and analyzed by the content suggestion service 108.

As noted above, the content suggestion service 108 may be part of and/or may interact with the content and communication system 102. Accordingly, it will be understood that operations that are ascribed herein to the content suggestion service 108 need not be performed exclusively by the content suggestion service 108. Thus, for example, aspects of operations ascribed to the content suggestion service 108 may be performed by the content and communication system 102 (and/or components thereof), either independently or in conjunction with the content suggestion service 108 (and/or other systems and/or services).

The sending and receiving of communication events may be facilitated by the content and communication services 110 of the content and communication system 102, and the communication events may be analyzed by the content suggestion service 108 in order to determine subject matter of the chat session (or a portion thereof) so that content and/or personnel suggestions may be provided to users.

The chat session selection region 202 may include a listing of chat sessions or channels that are accessible to the user and/or that the user is a participant in. As shown in the example of FIG. 2A, the user of the client device 104-1 (e.g., user 1) is participating in or otherwise able to access three different chat sessions: chat 1, chat 2, and chat 3. Of course, the user may participate in or otherwise access more or fewer chat sessions. Users may select which chat content to view by clicking on or otherwise selecting the different chat sessions shown in the chat session selection region 202. As shown in FIG. 2A, user 1 has selected "chat 1," and as such, the content in the chat content region 200 and the content suggestion region 204 relate to "chat 1." Further, chat sessions may have multiple associated sub-sessions or threads, which may be individually selectable by a user. For example, the chat session 210 ("chat 1") may have one or more sub-sessions or threads, which may correspond to a different topic or sub-topic, have a different set of participants (e.g., a subset of the participants in chat 1, more participants than in chat 1, an entirely different set of participants, or the like).

In some cases, each chat session is associated with one or more topics. The topic(s) may be user-defined, or they may be automatically generated. For example, a participant in the real-time chat session may set the topic when initiating the chat session (or at a later time) to reflect an intended topic of the chat. The topic may be changed later by a participant of the chat session. Additionally or alternatively, the system may suggest or auto-populate a topic of the chat session, such as by analyzing one or more communication events of the chat session (e.g., with natural language processing or any other suitable technique).

The content suggestion region 204 may display identifiers 212 of suggested content items (also referred to as content items 212). The identifiers may be links, shortcuts, or other objects that can be selected by a user to cause the content item to be loaded, displayed, downloaded, or otherwise provided to the user. In some cases, the identifiers of the content items may include information such as file names, file types, associated applications, date of creation/editing, author, names/identifiers of individuals who have interacted with the content item, etc. In some cases, the identifiers include a preview of the content item, such as a sampling of the text, image, code, or other content in the content item.

Figure 2B:
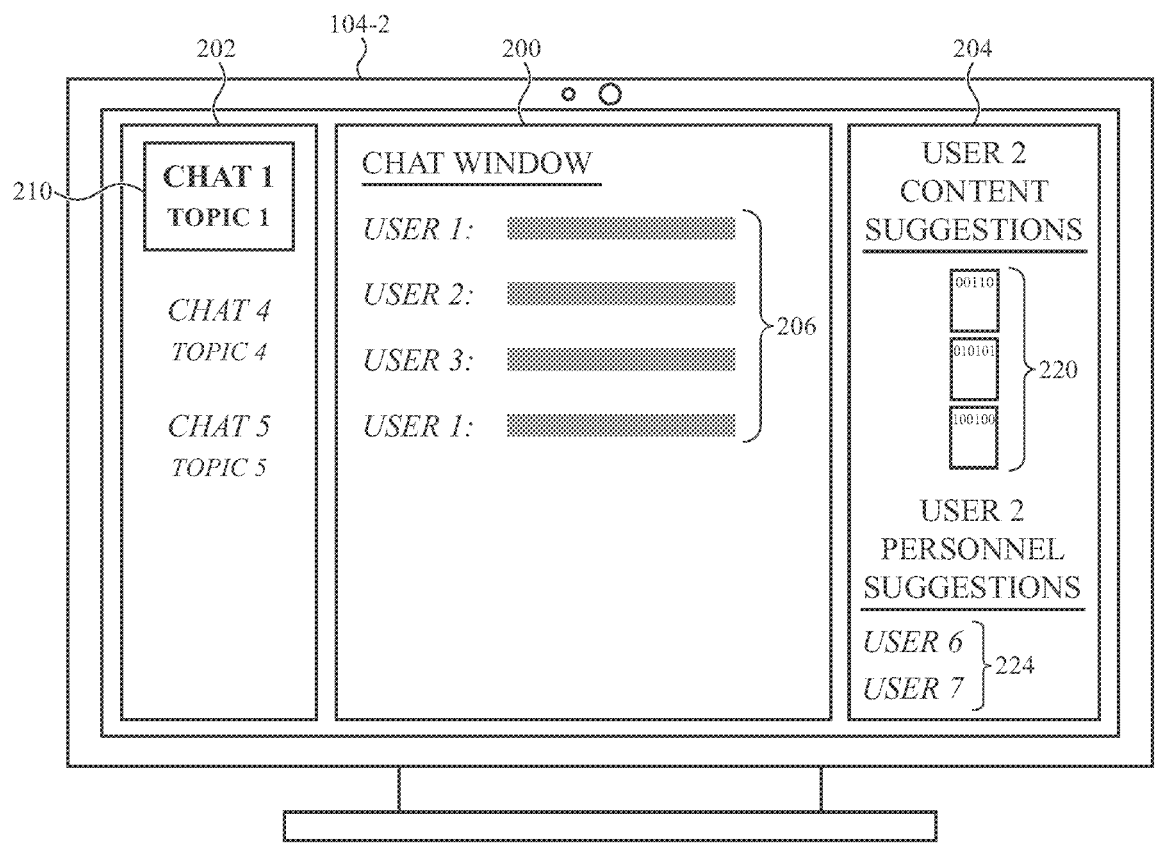
FIG. 2B depicts another example client device and user interface that may be used to provide content and personnel suggestions to a second user of a collaborative content management and communication system, as described herein.

As described herein, suggested content items may be specifically tailored for the user to which they are provided. Thus, FIG. 2A indicates that the content suggestions are specifically for user 1 of the chat. More particularly, the content suggestion region 204 shows different content suggestions for different users or participants in the real-time chat session. FIG. 2B, discussed below, illustrates an example user interface of user 2 in the same chat session shown in FIG. 2A, showing how the content suggestions are different for different participants in the chat session.

With reference to FIG. 2A, in some cases, the content suggestion region 204 also displays identifiers 216 of other individuals or users who may be relevant to the user-defined topic and/or the determined subject of the chat session (and/or to the content items that are suggested in the content suggestion region 204). The suggested personnel may be determined by the content suggestion service 108, such as by analyzing one or more multi-dimensional association graphs to identify the personnel suggestions. The personnel suggestions shown in the personnel suggestion region 204 may be selectable by the user of the client device 104-1 to initiate further actions. For example, selecting (e.g. clicking, pressing, tapping, or the like) the text of the identifiers 216 (and/or an icon or other graphical object shown in association with the text) may cause the client device 104-1 to initiate a communication with the associated individual (e.g., an email, chat session, telephone call, text message, etc.). As another example, selecting an identifier 216 may cause contact information of the individual (and/or other information such as an employee bio or profile) to be displayed. As another example, selecting an identifier 216 may cause the person associated with that identifier to be invited to the chat session (e.g., the chat session from which the personnel suggestion was generated, such as "chat 1" in FIG. 2A.

As described herein, the content and personnel suggestions shown in FIG. 2A may be determined by the content suggestion service 108, and may be based at least in part on the subject of the chat session and the user to whom the suggestions are being provided. For example, the content suggestion service 108 may receive one or more communication events exchanged between the first user and other users in the chat session (e.g., the communication events 206 between user 1, user 2, user 3 in FIG. 2A). The content suggestion service 108 may then determine, using the received one or more communication events, a subject of the chat session. The subject of the chat session may be different from the user-defined topic of the chat session, as the subject is determined by the content suggestion service 108, rather than being defined by the user. (In some cases, the user-defined topic is used by the content suggestion service 108 as a factor in determining the subject of the chat session.)

Once the subject of the chat session (or a portion of the chat session) has been determined, the content suggestion service 108 may identify candidate content items that are related to the subject of the chat session and to the user for whom the suggestions are to be provided. In some cases, in order to identify the content and/or personnel suggestions, the content suggestion service 108 obtains an identity vector of the target user and identifies candidate content items that are associated with access vectors that satisfy a similarity threshold with the identity vector of the user. The similarity threshold may be a similarity of the identity vector and the content vector of greater than about 50%, greater than about 75%, greater than about 85%, or any other suitable threshold value. Once the candidate content items are identified, identifiers of at least a subset of the candidate content items may be displayed to the target user, as shown in the content suggestion region 204 of the graphical user interface shown in FIG. 2A.

In some cases, in order to identify the candidate content items that are presented to the user in the chat, the content suggestion service 108 analyzes the multi-dimensional association graph to identify, based at least in part on the associations between content items and the users in the organization, a set of candidate content items related to the subject of the chat session and to the identity vector of the first user. In such cases, the content suggestion service 108 may omit a direct comparison between the identity vector of a user and the access vectors of content items. In some cases, content items are not directly associated with access vectors, and as such the system may identify the candidate content items by analyzing the multi-dimensional association graph to identify the potentially relevant content items. In some cases, identity vectors of the user are not used, and an analysis or query of the multi-dimensional association graph using the subject matter of the chat session and an identifier of the user for whom the suggestions are intended may return relevant content item suggestions.

In some cases, instead of or in addition to the subject of the chat session as identified by the content suggestion service 108, the system may use the user-defined topic of the chat session to identify relevant documents. In some cases, the determination of the subject of the chat session may be based at least in part on the user-defined topic.

As noted above, content and personnel suggestions are customized to individual participants in the chat session. While FIG. 2A depicts the client device 104-1 and associated graphical user interface directed to user 1 in the chat session, FIG. 2B depicts the client device 104-2 displaying an example graphical user interface directed to user 2 in the chat session.

With reference to FIG. 2B, the graphical user interface of the client device 104-2 (FIG. 2B) is similar to the interface of the client device 104-1 (FIG. 2A), but because it is associated with a different user, it may display some different content. For example, the chat session selection region may display a different set of chat sessions (and associated user-defined topics). Thus, for example, because user 1 and user 2 are both involved in "chat 1," that chat session appears for both users. However, user 2 may be involved in other chat sessions that user 1 is not involved in, and as such the chat sessions available to each user may be different.

FIGS. 2A and 2B both illustrate the users engaging in "chat 1," and as such the content of the chat content region 200 may be the same for both users. However, because the content suggestions are customized or tailored for each unique user in the chat session, the content shown in the content suggestion region 204 of the client device 104-2 (e.g., for user 2) are different than those for user 1. More particularly, the content suggestion region 204 in FIG. 2A shows a first set of suggested content items 212, the content suggestion region 204 in FIG. 2B shows a second, different set of suggested content items 220. Similarly, the personnel suggestions in FIG. 2B are different than those shown to user 1 in FIG. 2A.

In some cases, the difference in content and personnel suggestions may be based solely on the difference in the identities of the users for whom the content suggestions are determined. Thus, for example, based on the subject of the chat session, the system may identify a set of content items (and/or personnel) that are relevant to that subject. Without further analysis, the same content items may be suggested to all of the users. However, the system as described herein effectively determines the relevance of the content items to each individual user based on that user's identity. The user's identity may be characterized in the system as the user's identity vector, as described herein. Regardless of the particular data structure that is used to uniquely identify the user, the user's identity may include factors such as a title, position, role, or rank of the user in an organization (e.g., c-level executive, manager, engineer, salesperson, etc.), a relative position in a hierarchy in an organization or entity, a technical rating of the user, the type of documents with which the user has interacted with, a user's department, a user's team associations, a user's level of education and/or degree, a geographical location or office location of the user, a technical rating of the user (e.g., whether the user is considered a technical or non-technical user, or a score or rating on a scale), or the like. Based on these, and optionally other or different factors, the system identifies unique content and personnel that are relevant to both the subject and the user, and provides those unique content and personnel suggestions to each unique user. Thus, returning to FIGS. 2A and 2B, the subject of the chat session (based on the communication events 206) may relate to a product sold by the company. If the user of the client device 104-1 in FIG. 2A is a c-level executive, the suggested content items 212 may include financial reports and other high-level corporate documents related to the product, while if the user of the client device 104-2 in FIG. 2B is an engineer, the suggested content items 220 may include source code and other technical documents related to the product. Thus, each user is provided with documents that are specifically relevant to them, and neither user has to filter through irrelevant or unhelpful documents.

Personnel suggestions may be similarly targeted to individual users. Continuing the example from above, based on the subject of the chat session and the identities of the different users, the personnel suggestions for user 1 may be managers or team-leads associated with the product, while the personnel suggestions for user 2 may be other engineers of similar rank and/or position who have worked on the product.

While FIGS. 2A-2B illustrate content and personnel suggestions for two users, similar techniques may be used to provide personalized content and personnel suggestions to however many users are participating in the chat session. In some cases, users can opt-in and/or opt-out of the personalized content suggestions. For example, each user may be able to indicate whether they want suggestions to be provided at all, and/or whether they want suggestions to be specifically targeted to their own identity, or if they would rather receive content/personnel suggestions based only on the subject matter of the conversion, the user-defined topic, or the like.

In some cases, the content suggestion service 108 may identify more than one subject of the chat session. For example, when analyzing the communication events 206, the content suggestion service 108 may determine multiple candidate subjects based on the semantic content of the communication events 206. In such cases, the content suggestions may include different content suggestions for each subject.

Figure 2C:
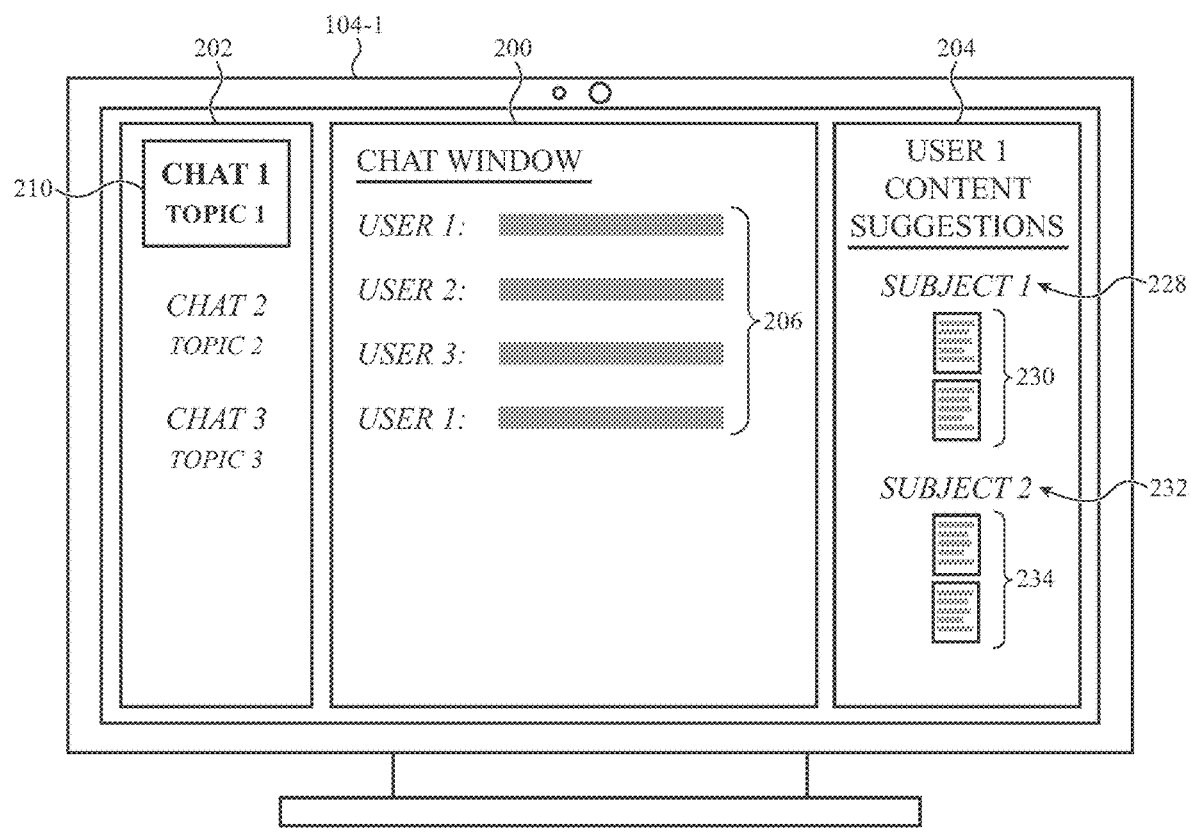
FIG. 2C depicts another example client device and user interface that may be used to provide content suggestions for various subjects to a user of a collaborative content management and communication system, as described herein.

FIG. 2C depicts an example of the client device 104-1 in cases when multiple subjects are identified in the chat session. In this example, the content suggestion region 204 includes a first set of suggested content items 230 related to a first subject 228 identified in the chat session, and a second set of suggested content items 234 related to a second subject 232 identified in the chat session. In some cases, the types of content items for the first and second subjects may be different, due to the different way in which a user interacts with documents relating to each subject. Thus, for example, if the primary documents interacted with by a c-level executive for a first subject are financial documents, and for a second subject are marketing materials, then that user may be provided with financial documents for the first subject, and marketing materials for the second subject. These types of subject-content type preferences for individual users may be encoded or represented in the multi-dimensional association graph of the system (and/or the identity vector of the user and access vectors of the content items), such that by analyzing the graph the system can quickly and efficiently identify the most relevant content items.

As noted above, chat sessions between users may relate to multiple different subjects. Further, the subject of a chat session may change or evolve over the course of the chat session. As the subject of the chat session changes, content and personnel suggestions may become stale or lose their relevance to the chat session. Accordingly, the system may change or modify its content and personnel suggestions in response to the changing subjects of the chat session.

Figure 2D:
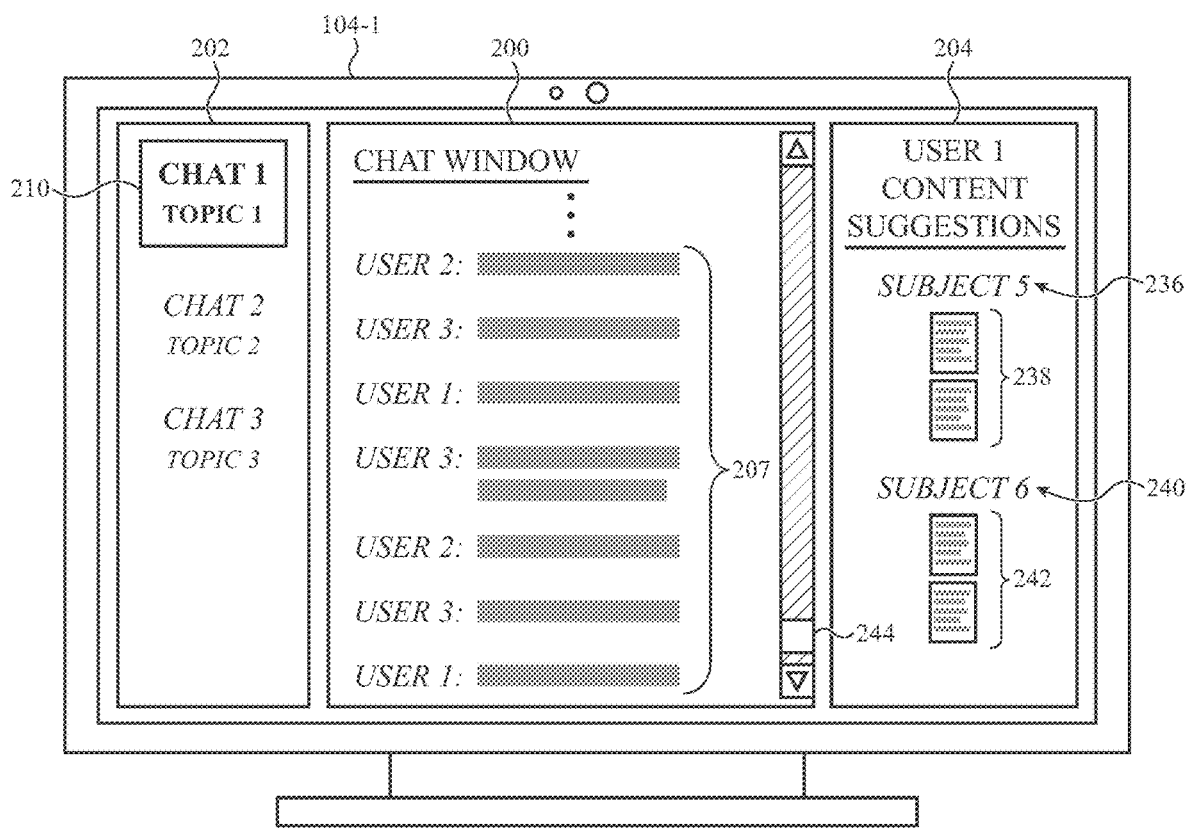
FIG. 2D depicts another example client device and user interface that may be used to provide content suggestions for various subjects to a user of a collaborative content management and communication system, as described herein.

FIG. 2D depicts an example graphical user interface on the client device 104-1 after the chat session has evolved. In particular, as indicated in the chat session selection region 202, the user of the client device 104-1 is still involved in "chat 1." The chat content region 200 includes subsequent communication events 207 (e.g., communication events exchanged after those shown in FIGS. 2A-2C), as further indicated by the position of the scroll bar 244 (showing that the displayed communication events 207 are later in the history of the chat session).

As the chat session progresses, the system may reanalyze the communication events of the chat session to determine another subject of the chat session. In some cases, the system analyzes a subset of the total communication events associated with the chat session (e.g., less than all of the communication events in the total timeline of the chat session) to determine a segment-specific subject. For example, the subject may be determined based on the communication events that are displayed to a user. Thus, the determination of the subject my match that of the text that is actually visible to the user. As another example, the subject may be determined based on a certain number of communication events (e.g., the most recent 10, 20, or 30 communication events, or any other suitable number). As yet another example, the subject may be determined based on a certain number of words in the chat session (e.g., the most recent 100 words, 200 words, 300 words, or any other suitable amount). As yet another example, the subject may be determined based on the communication events that were exchanged within a time window (e.g., all communication events exchanged in a time window of 3 minutes, 5 minutes, 10 minutes, or any other suitable duration). Where a time window is used, the time window may be measured from the time of the most recent communication event.

Returning to FIG. 2D, the content suggestion service 108 has analyzed the communication events 207 and identified two different subjects 236, 240 (e.g., subject 5 and subject 6, respectively), and have identified corresponding suggested content items 238, 242 for each subject. Notably, the subjects 236, 240 identified from the communication events 207 are different than those identified from the communication events 206 in FIGS. 2A-2C, and thus result in different suggested content items 238, 242 being suggested to the user. In some cases, personnel suggestions are also determined based on recent communication events (e.g., the communication events 207) and provided to the user. Further, the suggested content items 238, 242 may be determined for each unique user, such that user 2 (who may be the user of the client device 104-2) may receive different suggested content items for subject 5 and subject 6 based on user 2's unique identity (e.g., position or role in the organization, content interaction history, etc.).

In some cases, previously displayed suggestions of content items and personnel suggestions may remain accessible to the user. For example, the user of the client device in FIG. 2D may be able to scroll through the communication events in the chat content region 200 (e.g., using the scroll bar 244) to view an earlier portion of the chat session (e.g., communication events exchanged during that earlier portion of the chat session). The content suggestion service 108 may cause the client device 104-1 to display the suggested content items that were provided during the earlier portion of the chat session. This may allow the user to review the chat session at a later time and view the suggested content items and personnel that were relevant to a particular part of the chat session, thereby providing a useful historical record of the chat and the associated content suggestions.

In order to display the historical content item and personnel suggestions, the content suggestion service 108 may maintain records of the content items and/or personnel that were suggested, along with the particular location in the chat history at which they were suggested. In such cases, when a user reviews earlier communication events, the content suggestion service 108 accesses the records of the suggestions and provides the same suggestions to the user. In other cases, the content suggestion service 108 may reanalyze historical communication events to provide the suggestions. For example, the user may navigate the chat content region 200 to a certain group of communication events (or otherwise select or specify a group of communication events, such as by highlighting), and the content suggestion service 108 determines the subject of that group of that group of communication events, and identifies candidate content items based on that subject and the target user's identity. For example, the content suggestion service 108 may use the position of the scroll bar 244 to determine the particular time window of the chat session to analyze (e.g., to identify which communication events in the chat session are to be analyzed). In some cases, the user may select a single word or a phrase from a communication event, and cause the content suggestion service 108 to suggest content items using the selected word or phrase as the subject.

Figure 3:
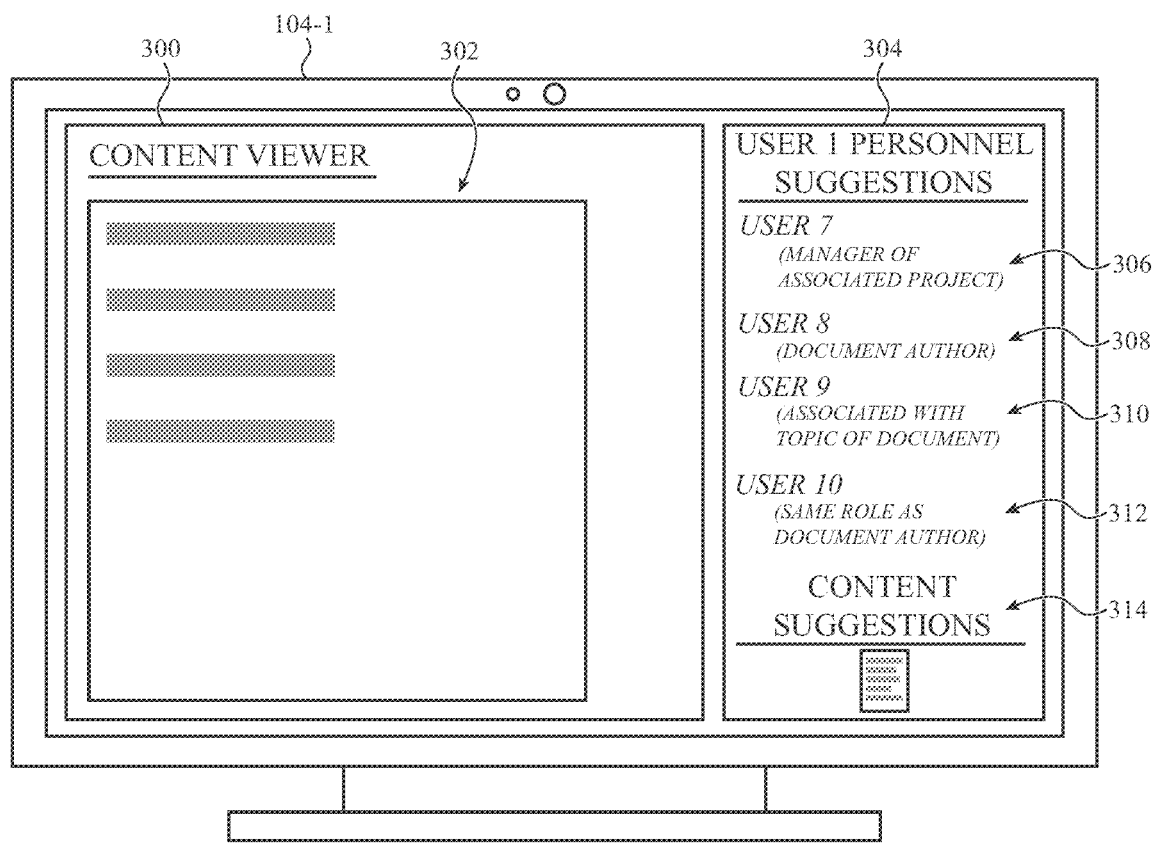
FIG. 3 depicts another example client device and user interface that may be used to provide personnel suggestions to a user of a collaborative content management and communication system, as described herein.

As described above, in addition to suggesting content items, the content suggestion service 108 may also suggest, to a user, other individuals who may be relevant to the user's interests. As shown in FIGS. 2A-2B, for example, such suggestions may also be based on the communication events of a real-time chat session. In some cases, personnel suggestions may also be provided based on content items that are accessed by a user. FIG. 3 depicts the client 104-1 displaying a graphical user interface in which personnel suggestions are provided based on content interactions.

As shown in FIG. 3, the client 104-1 may display a content viewer region 300 and a personnel suggestion region 304. The content viewer region 300 may represent or be part of an application that is designed for viewing, editing, creating, or otherwise interacting with content items. Thus, for example, if the content item 302 is a text document, the content viewer region 300 may correspond to a graphical user interface of a word processing application; if the content item 302 is source code for a computer program, the content viewer region 300 may correspond to a code editor; if the content item 302 is an image or photograph, the content viewer region 300 may correspond to an image editor.

The personnel suggestion region 304 shows suggestions of other individuals who may be relevant to the content item with which the user of the client device 104-1 is interacting. The personnel suggestions may be generated by the content suggestion service 108 (optionally in conjunction with the content and communication system 102) based on various factors. For example, as noted above, personnel suggestions may be generated by determining users (other than the user of the client device) who have interacted with the content item in some way, including but not limited to authoring, editing, "liking" or endorsing, viewing, opening, and/or sharing the content. Personnel suggestions may also be based on associations between other individuals and the content item, even if those individuals have not interacted directly with the content item. For example, for a given content item, the content suggestion service 108 may suggest individuals who are associated with a project with which the content item is associated, or on a team of another individual who has interacted with the content item. As shown in FIG. 3, the content suggestion service 108 has identified four example individuals to recommend based on the content item 302 (which the user of the client device 104-1 is viewing, editing, or otherwise interacting with), in which each suggested individual is being suggested based on a certain reason or basis. In particular, suggestion 306 (user 7) is based on user 7 being the manager of a project with which the content item 302 is associated; suggestion 308 (user 8) is based on user 8 being the author of the content item 302; suggestion 310 (user 9) is based on user 9 being associated with a topic of the content item 302; and suggestion 312 (user 10) is based on user 10 having the same role and/or position in the organization as the author of the content item 302. In this way, the user of the client device 104-1 can easily and quickly evaluate the suggested individuals and determine who may be most useful to engage for further information about the content item or its associated subject matter.

Personnel suggestions may also be based on the identity of the user to whom the suggestion is being directed. Thus, for example, if a c-level executive is viewing a given content item, the individuals who are suggested may have higher level positions in an organization (e.g., managers, supervisors, department heads, etc.) than the individuals who would be suggested if an engineering intern were viewing the same content item (e.g., engineers, salespeople, other interns, etc.).

The content suggestion service 108 may determine individuals to recommend by analyzing the multi-dimensional association graph 122 (FIG. 1). For example, the multi-dimensional association graph 122 may represent or encode associations between individuals and content items (e.g., who has interacted with what content items, and in what way). The graph 122 may also represent or encode associations between properties of content items (e.g., associated projects, associated departments, associated teams, etc.) and properties of users (e.g., associated job titles, associated departments, projects, or teams, etc.). Accordingly, by analyzing the graph 122, the content suggestion service 108 can identify individuals who have a high relevance to a content item and to the user to whom the suggestion is being provided.

The personnel suggestions may be generated by querying the graph 122 with an identifier of the user and of the seed content (e.g., the content item being viewed or otherwise interacted with by the user). The graph query may return a listing of candidate personnel to recommend to the user. The listing of candidate personnel may correspond to a set of personnel with a relevance score or rank above a threshold value. In some cases, the personnel suggestions are generated by comparing an identity vector of a user (e.g., the user of the client device 104-1 in FIG. 3) with the access vector of the content item 302 and/or the identity vectors of other individuals. Thus, the suggested personnel identified by the content suggestion service 108 may be specifically relevant to both the seed content and to the type of personnel with whom the user typically or historically interacts.

The personnel suggestions shown in the personnel suggestion region 304 may be selectable by the user of the client device 104-1 to initiate further actions. For example, selecting (e.g. clicking, pressing, tapping, or the like) the text of the suggestions (and/or an icon or other graphical object shown in association with the text) may cause the client device 104-1 to initiate a communication with the associated individual (e.g., an email, chat session, telephone call, text message, etc.). As another example, selecting the text may cause contact information of the individual (and/or other information such as an employee bio or profile) to be displayed.

In some cases, in addition to personnel suggestions, the content suggestion service 108 may provide suggestions of content items (e.g., content suggestions 314) based on the content item being interacted with by the user. The suggested content items may be determined by the content suggestion service 108 based on a property of the seed content (e.g., the content item 302), such as an author or editor of the seed content, a subject of the seed content, a department, team, or project associated with the seed content, or the like. In some cases, the content suggestion service 108 determines a subject of the seed content by analyzing the seed content. For example, the content suggestion service 108 may use semantic analysis and/or natural language processing techniques to determine, based on text or other content in the seed content, a subject of the seed content.

Figure 4:
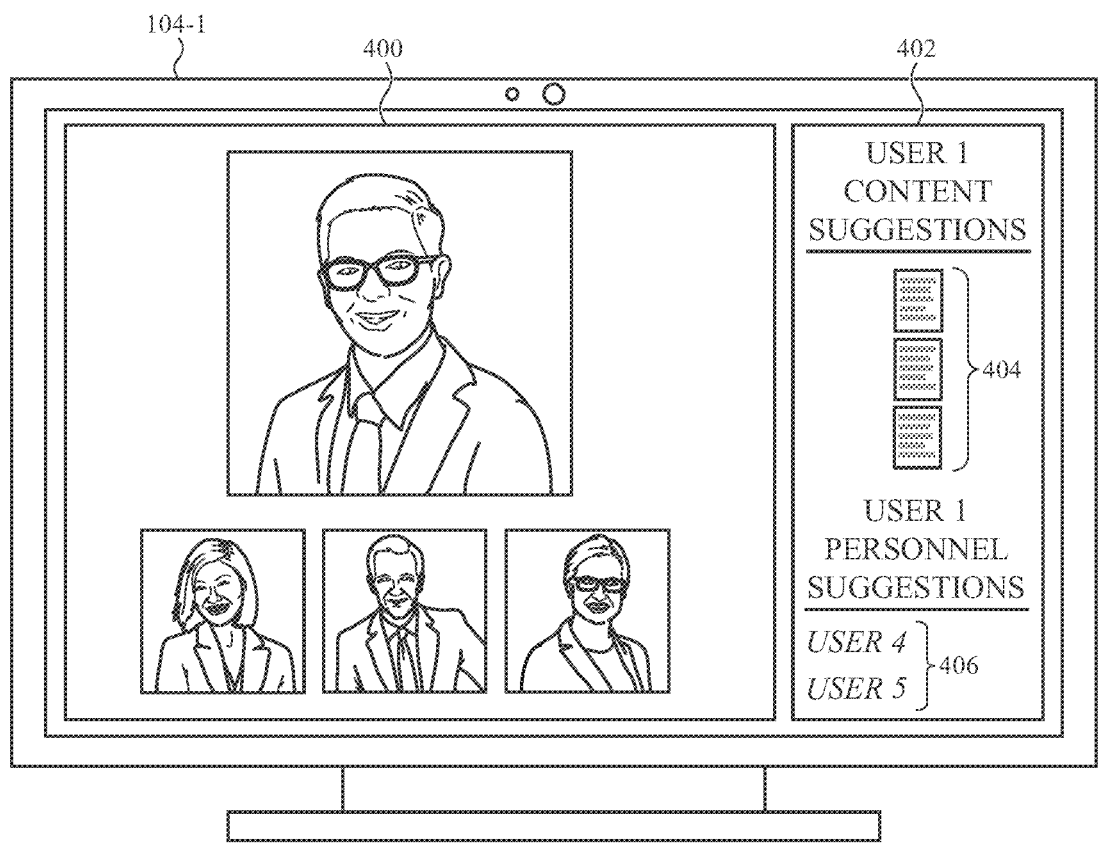
FIG. 4 depicts another example client device and user interface that may be used to provide personnel suggestions to a user of a videoconferencing service of a collaborative content management and communication system, as described herein.

As described above, content and personnel suggestions may be provided to users based on the subject(s) of real-time chat sessions. Chat sessions are only one example of interactions in which such suggestions may be provided. For example, content and personnel suggestions may be provided during video conferences, audio conferences, and/or other communication types. FIG. 4 illustrates an example in which content and personnel suggestions are provided during a videoconference, where the suggestions are based on the subject of the videoconference.

More particularly, FIG. 4 depicts the client device 104-1 displaying a videoconference interface 400 in which optional video feeds of one or more of the participants in the videoconference are displayed to the user of the client device 104. During the videoconference, the content suggestion service 108 may analyze communication events of the videoconference to identify one or more subjects being discussed or addressed on the videoconference. The analysis may include, for example, performing text-to-speech analysis on the audio content of the videoconference (e.g., on the audio streams of one or more participants in the videoconference), and then analyzing the resulting text to determine a subject (e.g., using semantic analysis, natural language processing, or other suitable techniques). Once a subject is obtained, content and personnel suggestions may be generated using the same or similar techniques as described herein with relation to the real-time chat sessions, including by analyzing a multi-dimensional association graph and/or comparing identity vectors to access vectors (or other identity vectors). Content suggestions 404 and personnel suggestions 406 may be displayed in a content suggestion region 402.

Though content and personnel suggestions are described with respect to real-time chat sessions (FIGS. 2A-2D), content interaction events (FIG. 3), and videoconferences (FIG. 4), these are merely some examples of contexts in which the suggestions may be provided. Indeed, the same or similar techniques may be applied to other types of communications, including but not limited to audio conferences, telephone calls, emails and/or email conversations, text messages, in-person meetings (e.g., by performing speech-to-text analysis on spoken conversations), and the like. As noted above, any implementation of the techniques described herein may be provided on an opt-in basis, such that users can select whether or not their communications may be analyzed or otherwise used to generate content and personnel suggestions.

Figure 5:
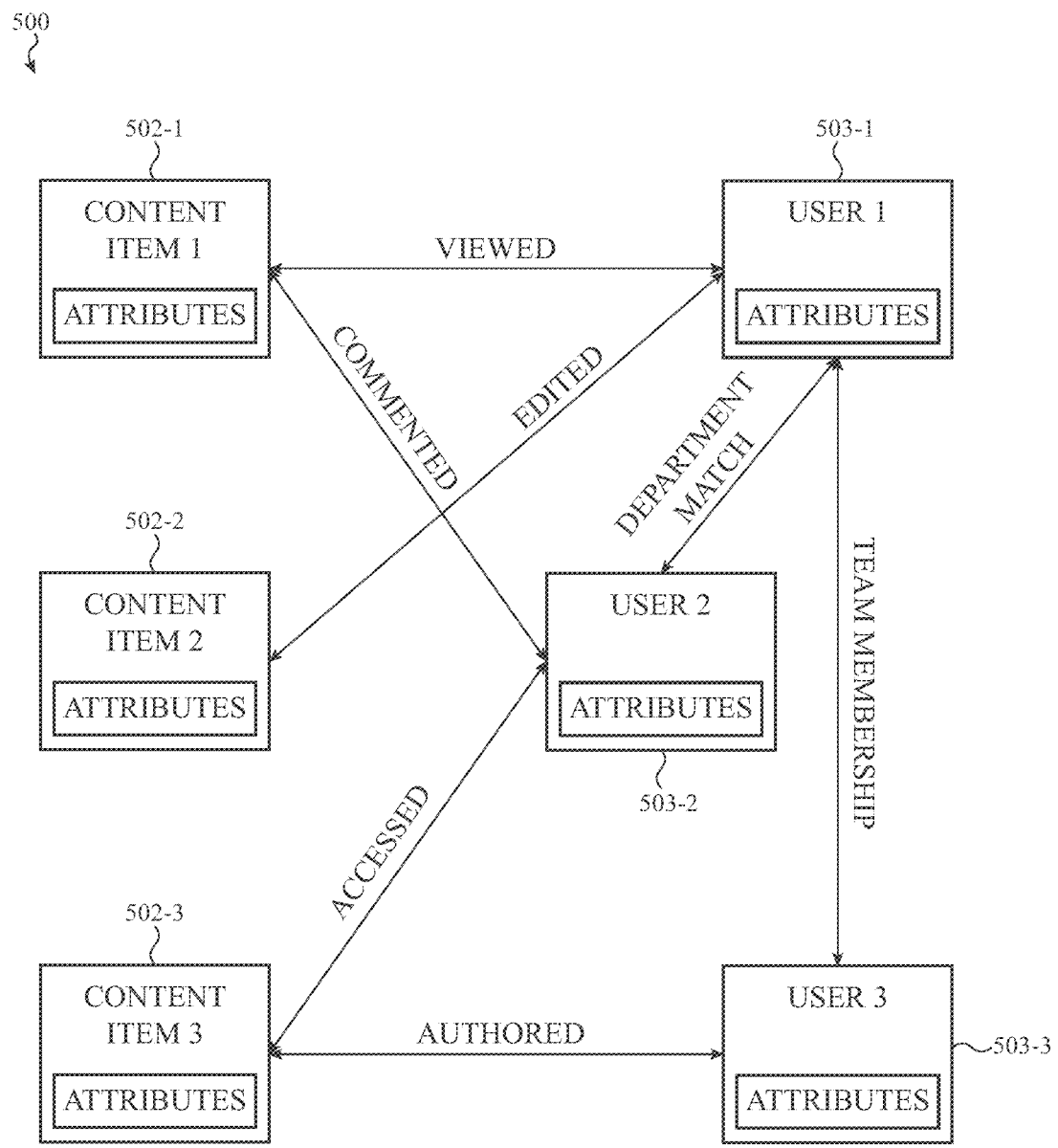
FIG. 5 depicts an example multi-dimensional association graph of content items and users in a collaborative content management and communication system, as described herein.

FIG. 5 depicts an illustrative example of a portion of a multi-dimensional association graph 500 (which may correspond to a portion of the graph 122, FIG. 1), showing how associations between users and content items may be encoded and/or represented in the graph. The portion of the graph 500 shown in FIG. 5 includes three users 503 (503-1, 503-2, 503-3) and three content items 502 (502-1, 502-2, 502-3). Each user and content item may further be associated with attributes that describe or represent the user or content item. Example attributes of users include but are not limited to names, departments, job titles, roles, teams with which they are associated, projects with which they are associated, supervisors, subordinates, team members, technical or occupational expertise, and identity vectors. In some cases, identity vectors include or reflect one or more attributes of the user. Example attributes of content items include but are not limited to document title, filename, file type, associated teams and/or departments, file storage location, associated projects, an identifier of an author of the content item, keywords in the content item, a technical rating or score of the content item, an access vector associated with the content item, or the like. In some cases, access vectors and identity vectors may be generated for content items and users based on the graph 500 itself, and then stored in association with the content item or user (e.g., as an attribute).

The graph 500 further includes associations between content items and users, represented by lines connecting the users and content items. The associations may be based on interaction events between the users and the content items. Thus, for example, user 503-1 is associated with content item 502-1 via a "viewed" association (indicating that the user has viewed that content item) and with content item 502-2 via an "edited" association (indicating that the user had edited that content item). User 503-2 is associated with content item 502-1 via a "commented" association (indicating that the user has commented on that content item), and with content item 502-3 via an "accessed" association (indicating that the user has accessed or opened that content item). User 503-3 is associated with content item 502-3 via an "authored" association (indicating that the user has authored that document). These are merely a few example associations that may be defined between users and content items.

In addition to associations between users and content items, the graph 500 encodes and/or represents associations between users. Thus, for example, user 503-1 is associated with user 503-2 via a "department match" association (indicating that the user 503-1 is in the same department as the user 503-2) and with user 503-3 via a "team membership" association (indicating that the user 503-1 and 503-3 are associated with a common team). Other associations between users may include, for example, shared relative rank in an organizational hierarchy (e.g., associating c-level users with other c-level users, managers with other managers, etc.).

Associations between content items and users may also correlate to associations between the attributes of content items and the attributes of the users. Thus, for example, if the user 503-1 is an engineering manager and the content item 502-1 is a source code file, the association between the user 503-1 and the content item 502-1 also represents an association between source code files and engineering managers (e.g., that engineering managers view source code files). And if the content item 502-2 is a specification for a product, the association between the user 503-1 and the content item 502-2 also represents an association between product specifications and engineering managers (e.g., that engineering managers edit product specifications). These types of associations between attributes of content items and users enables the graph 500 (and/or systems or services that user the graph) to provide uniquely relevant suggestions of both content items and users. Continuing the example from above, if an engineering manager is engaged in a chat about a certain subject, the systems and techniques described herein may return, using the graph 500, suggestions of source code, product specifications, and/or other similar content items (e.g., content items that have similar attributes and/or have similar associations with similar users and/or user attributes).

Figure 6:
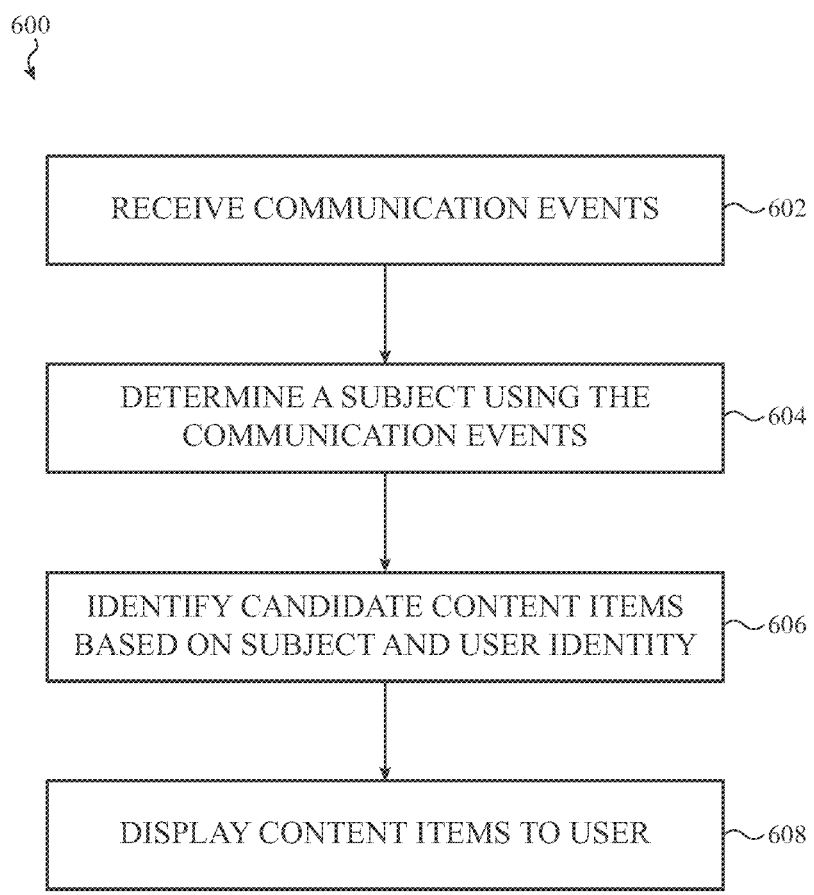
FIG. 6 depicts an example process for determining content item suggestions for users in a real-time chat session.

FIG. 6 is a flow chart of an example process 600 for generating and providing suggestions of content items and personnel to a user of a client device. The process 600 may be performed by a system comprising a content suggestion service (e.g., the content suggestion service 108, FIG. 1) and a collaborative content management and communication system (e.g., the content management and communication system 102, FIG. 1) that is communicably coupled to the content suggestion service. The collaborative content management and communication system may include a store of content items associated with an organization (e.g., the content store 118, FIG. 1). The content items in the store of content items may be associated with access vectors, as described herein. In some cases, access vectors are generated at least in part by analyzing content interactions between the content items and one or more users in the organization. In some cases, access vectors are generated by analyzing a multi-dimensional association graph that defines associations between the content items and users in the organization.

In some cases, the process 600 occurs during a real-time chat session between a first user and a second user. As described herein, a real-time chat session may correspond to a messaging application or service in which users can exchange messages (e.g., text-based messages) in an ongoing session. Messages, which are example communication events, may appear at a receiving user's client device substantially instantaneously after it is sent by a sending user, and may be displayed as part of an ongoing record or display of the communication events. Accordingly, the real-time chat session may resemble a text-message exchange. In some cases, the process 600 occurs in the context of other types of communications and/or communication applications, such as in an email client, a videoconference system, an audioconference system, or the like.

At operation 602, one or more communication events are received. The communication events may be text-based messages (e.g., chat or text messages, emails, etc.), audio streams or recordings, video streams or recordings, or the like. The communication events may be exchanged between users, and may be received by the content suggestion service 108 and/or the content and communication system 102.

At operation 604, a subject of the real-time chat session is determined, using the received communication events. Determining the subject of the real-time chat session may include analyzing the received communication events to determine a semantic content of the received one or more communications. Analyzing the received communication events may include performing natural language processing techniques such as statistical natural language processing, neural natural language processing, tokenization, lemmatization, sentiment analysis, or the like. In cases where the communication events include audio messages (e.g., streams or recordings of a user speaking), the audio messages may be converted to text using a speech-to-text conversion system prior to performing the natural-language processing.

In some cases, determining the subject of the real-time chat session includes obtaining a user-defined topic of the real-time chat session. For example, a chat session may be associated with a user-defined topic. In some cases, the topic is used as the subject of the real-time chat session, as one of multiple candidate subjects, or it is used during the analysis of the received communication events (e.g., as a seed or initial guess as to the subject of the chat session, as a term of known relevance, etc.).

At operation 606, candidate content items are identified based on the subject of the chat session and an identity of the user for whom the suggestions are being generated. In some cases, the candidate content items are identified by analyzing access vectors of content items and identity vectors of users. For example, candidate content items may be identified by finding candidate content items that are associated with respective access vectors that satisfy a similarity threshold with an identity vector of an intended user. If the access vector of a given content item and the identity vector of the user satisfy a similarity threshold (e.g., 75%, 80%, 85%, 90%, etc.), the content item may be included in the set of candidate content items.

As described herein, identity vectors of users may be based at least in part on factors such as a content interaction history of the users; positions of the user in an organization (e.g., a job title, a job description, a rank, etc.); departments, teams, and/or projects with which the users are associated; the users' supervisors, subordinates, and/or team members; technical or occupational expertise; the content items (and their attributes) that the users have interacted with, and the like. Identity vectors may be determined at least in part by analyzing a multi-dimensional association graph that defines and/or models associations between content items and users in the organization (e.g., the multi-dimensional association graph 122, FIG. 1).

Access vectors of content items may be based at least in part on interaction histories between the content items and users in the organization, and may also be determined at least in part by analyzing a multi-dimensional association graph that defines and/or models associations between content items and users in the organization. Notably, the access vectors are generated based on interaction histories with multiple users, including users who are different from those for whom a suggestion is being generated. Accordingly, the access vector is based on more than just the target user's access history and/or preferences, but on those of other users as well.

In some cases, the candidate content items may be identified by analyzing a multi-dimensional association graph. For example, the graph may be queried with the subject of the real-time chat session and an identifier of the user for whom the suggestion is being generated. The graph query may return content items (and optionally other personnel represented in the graph) that are relevant to the subject and the user. The graph query may initiate an analysis of the graph, in which the associations between content items and users are evaluated or queried to determine the extent to which they indicate a relevance to the subject matter and the target user.

In some cases, content items are first filtered by subject so that the graph analysis/query can be performed on a reduced set of content items. For example, the content items may be searched to identify those that are relevant to the subject of the chat session, thereby filtering out content items that appear not to match or be relevant to the subject. The subsequent analysis or query of the graph, to identify content items relevant to the user's identity vector, for example, may then be limited to the remaining content items (e.g., those that were found to be likely relevant to the subject).

At operation 608, an identifier of at least one of the candidate content items that was identified at operation 606 is displayed to the user. For example, a link to the content item, a preview of the content item, a shortcut to the content item, a snipped of the content item, a title and/or filename of the content item, or other identifier may be displayed to a user. The identifier may be displayed in conjunction with a display of the communication events, and optionally may be graphically associated with the particular communication events from which the subject was identified.

The process 600 described above may be performed for multiple different unique participants in the real-time chat session. Furthermore, because the content suggestions are specific to each individual user (e.g., their identity vector and/or other representation of their preferences and usage history as defined in an association graph), each user may receive different suggestions for the same subject. Thus, if a first user and a second user are in a chat session relating to a project, the process 600 may result in each user receiving different suggestions of content items and/or personnel.

For illustration purposes, some of the examples described herein use example of jobs, job titles, roles, and other organizational terms. These are merely examples, however, and are in no way limiting to the type of organization, company, or other entity in which the instant ideas may be used. Further, the content items described herein are also examples and are not limiting to the types of content items that may be stored in a data store and/or represented in a multi-dimensional association graph. Indeed, the type(s) of content item(s) and their attributes, as well as the attributes of users in the system, may be any content items and attributes that are used by or otherwise useful to a given organization or user of the system.

Figure 7:
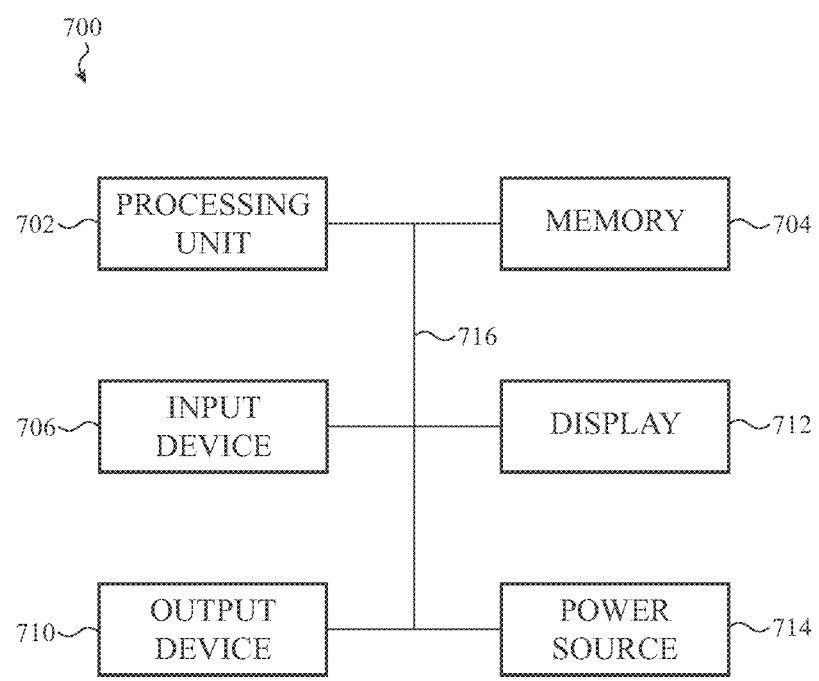
FIG. 7 depicts a sample electrical block diagram of an electronic device that may perform the operations described herein.

FIG. 7 illustrates a sample electrical block diagram of an electronic device 700 that may perform the operations described herein. The electronic device 700 may in some cases take the form of any of the electronic devices described with reference to FIGS. 1-5, including client devices 104 and/or servers or other computing devices associated with the content suggestion service 108, the content and communication system 102, and/or the communication service 111. The electronic device 700 can include one or more of a display 712, a processing unit 702, a power source 714, a memory 704 or storage device, input devices 706, and output devices 710. In some cases, various implementations of the electronic device 700 may lack some or all of these components and/or include additional or alternative components.

The processing unit 702 can control some or all of the operations of the electronic device 700. The processing unit 702 can communicate, either directly or indirectly, with some or all of the components of the electronic device 700. For example, a system bus or other communication mechanism 716 can provide communication between the processing unit 702, the power source 714, the memory 704, the input device(s) 706, and the output device(s) 710.

The processing unit 702 can be implemented as any electronic device capable of processing, receiving, or transmitting data or instructions. For example, the processing unit 702 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 700 can be controlled by multiple processing units. For example, select components of the electronic device 700 (e.g., an input device 706) may be controlled by a first processing unit and other components of the electronic device 700 (e.g., the display 712) may be controlled by a second processing unit, where the first and second processing units may or may not be in communication with each other.

The power source 714 can be implemented with any device capable of providing energy to the electronic device 700. For example, the power source 714 may be one or more batteries or rechargeable batteries. Additionally or alternatively, the power source 714 can be a power connector or power cord that connects the electronic device 700 to another power source, such as a wall outlet.

The memory 704 can store electronic data that can be used by the electronic device 700. For example, the memory 704 can store electronic data or content such as, for example, audio and video files, documents and applications, device settings and user preferences, timing signals, control signals, and data structures or databases. The memory 704 can be configured as any type of memory. By way of example only, the memory 704 can be implemented as random access memory, read-only memory, Flash memory, removable memory, other types of storage elements, or combinations of such devices.

In various embodiments, the display 712 provides a graphical output, for example associated with an operating system, user interface, and/or applications of the electronic device 700 (e.g., a graphical user interface associated with a communication or chat service, which may include graphical elements related to delivering content and/or personnel suggestions, etc.). In one embodiment, the display 712 includes one or more sensors and is configured as a touch-sensitive (e.g., single-touch, multi-touch) and/or force-sensitive display to receive inputs from a user. For example, the display 712 may be integrated with a touch sensor (e.g., a capacitive touch sensor) and/or a force sensor to provide a touch- and/or force-sensitive display. The display 712 is operably coupled to the processing unit 702 of the electronic device 700.

The display 712 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 712 is positioned beneath and viewable through a cover that forms at least a portion of an enclosure of the electronic device 700.

In various embodiments, the input devices 706 may include any suitable components for detecting inputs. Examples of input devices 706 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 706 may be configured to detect one or more particular types of input and provide a signal (e.g., an input signal) corresponding to the detected input. The signal may be provided, for example, to the processing unit 702.

As discussed above, in some cases, the input device(s) 706 include a touch sensor (e.g., a capacitive touch sensor) integrated with the display 712 to provide a touch-sensitive display. Similarly, in some cases, the input device(s) 706 include a force sensor (e.g., a capacitive force sensor) integrated with the display 712 to provide a force-sensitive display.

The output devices 710 may include any suitable components for providing outputs. Examples of output devices 710 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 710 may be configured to receive one or more signals (e.g., an output signal provided by the processing unit 702) and provide an output corresponding to the signal.

In some cases, input devices 706 and output devices 710 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 702 may be operably coupled to the input devices 706 and the output devices 710. The processing unit 702 may be adapted to exchange signals with the input devices 706 and the output devices 710. For example, the processing unit 702 may receive an input signal from an input device 706 that corresponds to an input detected by the input device 706. The processing unit 702 may interpret the received input signal to determine whether to provide and/or change one or more outputs in response to the input signal. The processing unit 702 may then send an output signal to one or more of the output devices 710, to provide and/or change outputs as appropriate.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A content suggestion system for suggesting one or more content items to a client application on a client device, the content suggestion system comprising:
   a content suggestion service; and
   a collaborative content management and communication system communicably coupled to the content suggestion service and comprising a store of content items associated with an organization, wherein a respective content item in the store of content items is associated with a respective access vector generated at least in part by analyzing content interactions with the respective content item by one or more users in the organization;
   wherein the content suggestion service is configured to, during a real-time chat session between a first user and a second user:
      receive one or more communication events exchanged between the first user and the second user;
      determine, using the received one or more communication events, a subject of the real-time chat session;
      obtain a first identity vector of the first user and a second identity vector of the second user;
      identify, in the store of content items, a first candidate content item related to the subject of the real-time chat session and associated with a first access vector that satisfies a similarity threshold with the first identity vector of the first user, and a second candidate content item related to the subject of the real-time chat session and associated with a second access vector that satisfies a similarity threshold with the second identity vector of the second user, the second candidate content item being different from the first candidate content item;

cause an identifier of each content item of a first set of content items including an identifier of the first candidate content item, but not an identifier of the second candidate content item, to be displayed to the first user in a graphical user interface associated with the real-time chat session on a first client device associated with the first user; and cause an identifier of each content item of a second set of content items including the identifier of the second candidate content item, but not the identifier of the first candidate content item, to be displayed to the second user in a graphical user interface associated with the real-time chat session on a second client device associated with the second user, the second client device different from the first client device.

2. The content suggestion system of claim 1, wherein the first identity vector of the first user is based at least in part on a content interaction history of the first user, and wherein the second identity vector of the second user is based at least in part on a content interaction history of the second user.

3. The content suggestion system of claim 2, wherein the first identity vector of the first user is based at least in part on a position of the first user in the organization, and wherein the second identity vector of the second user is based at least in part on a position of the second user of the organization.

4. The content suggestion system of claim 1, wherein determining the subject of the real-time chat session comprises at least one of:
analyzing the received one or more communication events to determine a semantic content of the received one or more communication events; or
obtaining a user-defined topic of the real-time chat session.

5. The content suggestion system of claim 1, wherein the respective access vector of the respective content item is based at least in part on:
an interaction with the respective content item by a third user different from the first user and the second user; and
a position of the third user in the organization.

6. A content suggestion system for suggesting one or more content items to a client application on a client device, the content suggestion system comprising:
a content suggestion service; and
a collaborative content management and communication system communicably coupled to the content suggestion service and comprising:
content items associated with an organization; and
a multi-dimensional association graph defining associations between the content items and users in the organization, a respective association between a respective content item and a respective user generated at least in part by analyzing a content interaction history between the respective content item and the respective user;
wherein the content suggestion service is configured to, during a real-time chat session between a first user and a second user:
receive one or more communication events exchanged between the first user and the second user;
determine, using the received one or more communications, a subject of the real-time chat session;
obtain a first identity vector of the first user and a second identity vector of the second user;
analyze the multi-dimensional association graph to identify, based at least in part on the associations between the content items and the users in the organization, a first set of content items related to the subject of the real-time chat session and to the first identity vector, and a second set of content items related to the subject of the real-time chat session and to the second identity vector;
cause an identifier of a first content item of the first set of content items, but not an identifier of a second content item of the second set of content items, to be displayed to the first user, on a first client device, in a first graphical user interface associated with the real-time chat session; and
cause the identifier of the second content item of the second set of content items, but not the identifier of the first content item of the first set of content items, to be displayed to the second user, on a second client device different from the first client device, in a second graphical user interface associated with the real-time chat session.

7. The content suggestion system of claim 6, wherein the content interaction history between the respective content item and the respective user includes at least one of an access of the respective content item by the respective user, an edit of the respective content item by the respective user, a comment on the respective content item by the respective user, or an authoring of the respective content item by the respective user.

8. The content suggestion system of claim 6, wherein:
obtaining the first identity vector of the first user comprises analyzing the multi-dimensional association graph to identify:
a third set of content items with which the first user has interacted; and
one or more attributes of each of the third set of content items.

9. The content suggestion system of claim 8, wherein obtaining the first identity vector further comprises generating the first identity vector based at least in part on the one or more attributes of each of the third set of content items.

10. The content suggestion system of claim 8, wherein the one or more attributes include one or more of:
a content type;
a technical rating;
a file storage location; and
an associated department within the organization.

11. The content suggestion system of claim 6, wherein the content suggestion service is configured to:
determine a second subject in the real-time chat session;
analyze the multi-dimensional association graph to identify, based at least in part on the associations between the content items and the users in the organization, a third set of content items related to the second subject of the real-time chat session and to the first identity vector, and a fourth set of content items related to the second subject of the real-time chat session and to the second identity vector;
cause an identifier of a third content item of the third set of content items, but not an identifier of a fourth content item of the fourth set of content items, to be displayed to the first user, on the first client device, in the first graphical user interface associated with the real-time chat session;
cause the identifier of the fourth content item of the fourth set of content items, but not the identifier of the third content item of the third set of content items, to be displayed to the second user, on the second client device, in the second graphical user interface associated with the real-time chat session; and
save the identifiers of the first content item of the first set of content items, the second content item of the second set of content items, the third content item of the third set of content items, and the fourth content item of the fourth set of content items in a chat transcript of the real-time chat session.

12. A content suggestion system for suggesting one or more content items to a client application on a client device, the content suggestion system comprising:
a content suggestion service; and
a collaborative content management and communication system communicably coupled to the content suggestion service and comprising content items associated with an organization;
wherein the content suggestion service is configured to:
generate a multi-dimensional association graph defining associations between the content items and users in the organization by analyzing content interaction histories of a plurality of users in the organization; and
during a real-time chat session between a first user and a second user:
receive one or more communication events exchanged between the first user and the second user;
determine, using the received one or more communications, a subject of the real-time chat session;
obtain a first identity vector of the first user and a second identity vector of the second user;
analyze the multi-dimensional association graph to identify a first set of candidate content items related to the subject of the real-time chat session and to the first identity vector of the first user, and a second set of candidate content items related to the subject of the real-time chat session and to the second identity vector of the second user;
cause an identifier of a first candidate content item of the first set of candidate content items, but not an identifier of a second candidate content item of the second set of candidate content items, to be displayed to the first user in a graphical user interface associated with the real-time chat session on a first client device; and
cause the identifier of the second candidate content item of the second set of candidate content items, but not the identifier of the first candidate content item of the first set of candidate content items, to be displayed to the second user in a graphical user interface associated with the real-time chat session on a second client device different from the first client device.

13. The content suggestion system of claim 12, wherein the content suggestion service is further configured to, after generating the multi-dimensional association graph, generate an updated multi-dimensional association graph by analyzing new content interaction histories of the plurality of users in the organization.

14. The content suggestion system of claim 12, wherein:
the first identity vector of the first user is based at least in part on a content interaction history of the first user; and
the second identity vector of the second user is based at least in part on a content interaction history of the second user.

15. The content suggestion system of claim 14, wherein the first identity vector of the first user is based at least in part on a position of the first user in the organization.

16. The content suggestion system of claim 12, wherein the content suggestion service is configured to:
determine a second subject in the real-time chat session;
analyze the multi-dimensional association graph to identify a third set of candidate content items related to the second subject of the real-time chat session and to the first identity vector of the first user, and a fourth set of candidate content items related to the second subject of the real-time chat session and to the second identity vector of the second user;
cause an identifier of a third candidate content item of the third set of candidate content items, but not an identifier of a fourth candidate content item of the fourth set of candidate content items, to be displayed to the first user in the graphical user interface associated with the real-time chat session on the first client device;
cause the identifier of the fourth candidate content item of the fourth set of candidate content items, but not the identifier of the third candidate content item of the third set of candidate content items, to be displayed to the second user in the graphical user interface associated with the real-time chat session on the second client device; and
save the identifiers of the first candidate content item of the first set of candidate content items, the second candidate content item of the second set of candidate content items, the third candidate content item of the third set of candidate content items, and the fourth candidate content item of the fourth set of candidate content items in a chat transcript of the real-time session.

17. A content suggestion system for suggesting one or more content items to a client application on a client device, the content suggestion system comprising:
a content suggestion service; and
a collaborative content management and communication system communicably coupled to the content suggestion service and comprising content items associated with an organization;
wherein the content suggestion service is configured to, during a real-time communication session between a first user and a second user:
receive one or more communication events exchanged between the first user and the second user during the real-time communication session;
determine a first query based at least in part on:
the one or more communication events; and
an identifier of the first user; and
determine a second query based at least in part on:
the one or more communication events; and
an identifier of the second user;
query the collaborative content management and communication system using the first query and the second query;
receive, from the collaborative content management and communication system and in response to the first query, a first set of candidate content items related to the first query;

receive, from the collaborative content management and communication system and in response to the second query, a second set of candidate content items related to the second query, the second set of candidate content items different from the first set of candidate content items;

cause an identifier of a first content item from the first set of candidate content items, but not an identifier of a second content item of the second set of candidate content items, to be displayed to the first user; and cause the identifier of the second content item from the second set of candidate content items, but not the identifier of the first content item of the first set of candidate content items, to be displayed to the second user.

18. The content suggestion system of claim 17, wherein determining the first query includes performing a natural language processing operation on the one or more communication events to determine a subject of the one or more communication events.

19. The content suggestion system of claim 17, wherein the content suggestion service is further configured to, after causing the identifier of the first content item to be displayed to the first user:

receive one or more subsequent communication events exchanged between the first user and the second user during the real-time communication session;

determine a third query based at least in part on:
  the one or more subsequent communication events; and
  the identifier of the first user;

query the collaborative content management and communication system using the third query;

receive, from the collaborative content management and communication system and in response to the third query, a third set of candidate content items related to the third query, the third set of candidate content items different from the first set of candidate content items; and cause an identifier of a third content item from the third set of candidate content items, but not the identifier of the first content item of the first set of candidate content items, to be displayed to the first user.

20. The content suggestion system of claim 19, wherein:

the identifier of the first content item is displayed to the first user while the one or more communication events are displayed to the first user; and the identifier of the third content item is displayed to the first user while the one or more subsequent communication events are displayed to the first user.

* * * * *